United States Patent
Vicharelli et al.

(10) Patent No.: US 6,636,743 B1
(45) Date of Patent: Oct. 21, 2003

(54) METHOD AND SYSTEM FOR ASSOCIATING A SERVER WITH A LOCATION IN A CELLULAR NETWORK

(75) Inventors: Pablo A. Vicharelli, Carlisle, MA (US); Pete A. Boyer, Somerville, MA (US)

(73) Assignee: Verizon Laboratories Inc., Waltham, MA (US)

(*) Notice: Subject to any disclaimer, the term of this patent is extended or adjusted under 35 U.S.C. 154(b) by 0 days.

(21) Appl. No.: 09/519,237

(22) Filed: Mar. 6, 2000

(51) Int. Cl.[7] .................................................. H04Q 7/20
(52) U.S. Cl. ..................... 455/456.1; 455/446; 455/449
(58) Field of Search .................. 455/436, 440, 455/441, 444, 446, 449, 456.1, 456.3, 423, 424, 67.11

(56) References Cited

U.S. PATENT DOCUMENTS

| | | | |
|---|---|---|---|
| 5,134,709 A | 7/1992 | Bi et al. .................... 455/33.1 |
| 5,574,466 A | 11/1996 | Reed et al. ................. 342/359 |
| 5,640,677 A | * 6/1997 | Karlsson ..................... 455/444 |
| 5,710,758 A | 1/1998 | Soliman et al. ............. 370/241 |
| 5,963,867 A | 10/1999 | Reynolds et al. ........... 455/457 |
| 5,974,322 A | * 10/1999 | Carlsson et al. ............ 455/446 |
| 6,002,934 A | 12/1999 | Boyer et al. ................ 455/447 |
| 6,014,565 A | * 1/2000 | Bonta ......................... 455/440 |
| 6,285,874 B1 | * 9/2001 | Magnusson et al. ..... 455/456.1 |

OTHER PUBLICATIONS

Hanly S., "An Algorithm for Combined Cell–Site Selection and Power Control to Maximize Cellular Spread Spectrum Capacity", IEEE Journal on Selected Areas in Communications, vol. 13, No. 7, Sep. 1995, pp. 1332–1340.

Yates R. and Huang C., "Integrated Power Control and Base Station Assignment", IEEE Transactions on Vehicular Technology, vol. 44, No. 3, Aug. 1995, pp. 634–644.

D. Calofonos and D. Fagen, "Modeling the Hand–off Mechanism Effect on the In–Cell and Other–Cell Interference of IS–95 Cellular CDMA Networks", IEEE Vehicular Technology Conference, Sep. 1999, Amsterdam, Holland, pp. 1–5.

* cited by examiner

*Primary Examiner*—Quochien Vuong
(74) *Attorney, Agent, or Firm*—Leonard Charles Suchyta; James K. Weixel

(57) ABSTRACT

In a cellular communication network (20) employing a network planning tool (38), a method (42) and system (48) associate servers (22) with pixels (74) that correspond to locations in an actual cellular environment. When the server (22) resides in a proximity region (88) surrounding a pixel (74) at which a radiofrequency signal (90, 102) is detected, that server (22) is associated with the pixel (74). When no servers (22) reside in the proximity region (88), a server (22) is selected in response to power levels (124, 128) of the detected radiofrequency signals (90, 102) at the pixel (74). When a computed power difference between the power levels is below a power difference threshold, the server (22) is selected for association with the pixel (74) in response to a random selection procedure. Alternatively, when the computed power difference is greater than the power difference threshold, the server transmitting the one of the radiofrequency signals (90, 102) exhibiting the greater power level is selected for association with the pixel (74).

27 Claims, 16 Drawing Sheets

| LOCATION 112 | FIRST SERVER SITE IDENTIFIER 114 | FIRST POWER LEVEL, $P_1$ (dB) 116 | SECOND SERVER SITE IDENTIFIER 118 | SECOND POWER LEVEL, $P_2$ (dB) 120 |
|---|---|---|---|---|
| (i-n, j-n) | . | . | . | . |
| . | . | . | . | . |
| . | . | . | . | . |
| . | . | . | . | . |
| (i-l, j-l) | A | 113 | B | 109 |
| (i, j-l) | - | 0 | - | 0 |
| (i+l, j-l) | - | 0 | - | 0 |
| (i-l, j) | A | 113 | B | 111 |
| (i, j) | A | 111 | B | 112 |
| (i+l, j) | A | 109 | - | 0 |
| (i-l, j+l) | - | 0 | - | 0 |
| (i, j+l) | - | 0 | B | 113 |
| (i+l, j+l) | - | 0 | B | 114 |
| . | . | . | . | . |
| . | . | . | . | . |
| . | . | . | . | . |
| (i+n, j+n) | . | . | . | . |

FIG. 9

METHOD AND SYSTEM FOR ASSOCIATING A SERVER WITH A LOCATION IN A CELLULAR NETWORK

TECHNICAL FIELD OF THE INVENTION

The present invention relates to the field of cellular communication systems. More specifically, the present invention relates to defining the radio coverage areas of servers for use in cellular network planning tools.

BACKGROUND OF THE INVENTION

As cellular communication has become more popular, cellular service providers have felt increasingly pressured to use the cellular radiofrequency (RF) spectrum as efficiently as possible. Greater efficiency allows a service provider to carry more calls using a given amount of RF spectrum. The problem of efficiently assigning the given amount of RF spectrum, i.e., channels, within a cellular network is a complex one.

Typically, a service provider is allocated a pool of channels for use within a network. The provider controls the assignment of the channels of the pool to various cells in the network. Automated approaches to network planning are being developed to assist service providers in devising channel assignment plans for cellular networks. Some automated network planning tools involve simulating the actual cellular network to predict the propagation of radiofrequency (RF) signals in order to define the radio coverage areas for the servers, e.g., base stations, to characterize potential interference within a simulated environment in order to effectively make channel assignments, to perform hand-off analysis, and so forth.

A realistic representation of the radio coverage areas for servers in the simulated cellular network is useful for subsequent related activities such as predicting carrier-to-interference ratios, hand-off analysis, channel assignment, macrocellular and microcellular planning, CDMA optimization, and so forth. Indeed, definition of the radio coverage areas is of particular interest at locations where two or more cells overlap.

Two or more cells may overlap along cell boundaries and along boundaries of sectors within a cell. In addition, overlap occurs when one cell, sometimes referred to as a microcell, is partially or wholly located within a larger cell, sometimes referred to as a macrocell.

In the simulated cellular network, associating servers with particular locations within the cellular network may be based on rigid selection criteria. For example, one selection criterion may be relative signal strength. That is, a radiofrequency signal may be transmitted from a first server and detected at a predetermined location. Another server then transmits a radiofrequency signal which is subsequently detected at the predetermined location. The server exhibiting the greater signal strength at that particular location is then determined to be the preferred, or better, server for that location.

When the signal strength of the signals transmitted from the servers and detected at the particular location are substantially equivalent, one simulation technique may be to arbitrarily select one of the two cells, or sectors, depending upon order of analysis to associate with a particular location. Such rigid selection criteria can introduce bias when defining the coverage area of a particular server. That is, if the selection algorithm is biased to consistently select one server over another in overlapping regions, a simulated radio coverage area for the one selected server will appear to be bigger than it actually is. Such a bias introduces error into the subsequent network planning activities because one cell or sector may appear busier than its overlapping cell or sector since the simulated radio coverage area has grown disproportionately large.

Server selection based upon relative signal strength is also problematic in areas having both microcellular coverage and macrocellular coverage. Macrocellular coverage is optimized to serve users moving in vehicles at relatively high speeds. Conversely, microcellular coverage is optimized for users, such as pedestrians, who are not moving at relatively high speeds. As a result, a microcell is typically a smaller geographic unit than a macrocell and a microcell server for the microcell typically transmits at a lower power level than a macrocell server. The use of microcells is desirable because the equipment for the microcell server is less costly due to the low transmission power requirements. In addition, the lower power transmission levels result in a more efficient use of the frequency spectrum because the channels used in the microcell can be reused closer to the microcell than a conventional macrocell channel reuse pattern.

Unfortunately, since the signal strength of the radiofrequency signal transmitted from the macrocell server is typically higher, the radiofrequency signal transmitted from the macrocell server may consistently dominate the radiofrequency signal transmitted from the microcell server in the simulated environment. Accordingly, bias for or against each of the macrocell and the microcell may be introduced when defining the radio coverage areas of each of the macrocell and the microcell.

SUMMARY OF THE INVENTION

Accordingly, it is an advantage of the present invention that an improved system and method are provided for associating a server with a location in a cellular network.

Another advantage of the present invention is that the system and method simulate radio coverage areas that approximate real world cellular network performance.

Another advantage of the present invention is that the system and method define the radio coverage areas to more closely portray the actual radio coverage area so that call traffic loads for overlapping cells may be accurately predicted.

It is yet another advantage of the present invention that the system and method of associating servers with locations substantially avoids the ill effects of bias.

The above and other advantages of the present invention are carried out in one form by a method of associating a server with a location in a cellular network. The method calls for detecting a first radiofrequency signal exhibiting a first power level at the location, the first radiofrequency signal being transmitted from a first server, and detecting a second radiofrequency signal exhibiting a second power level at the location, the second radiofrequency signal being transmitted from a second server. A proximity region is defined surrounding the location. When one of the first and second servers resides in the proximity region and a second one of the first and second servers resides outside of the proximity region, the method calls for selecting the one of the first and second servers residing in the proximity region to associate with the location.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 9 shows a table combining data obtained from the first power map of FIG. 5 and the second power map of FIG. 7;

DETAILED DESCRIPTION OF THE PREFERRED EMBODIMENTS

Figure 1:
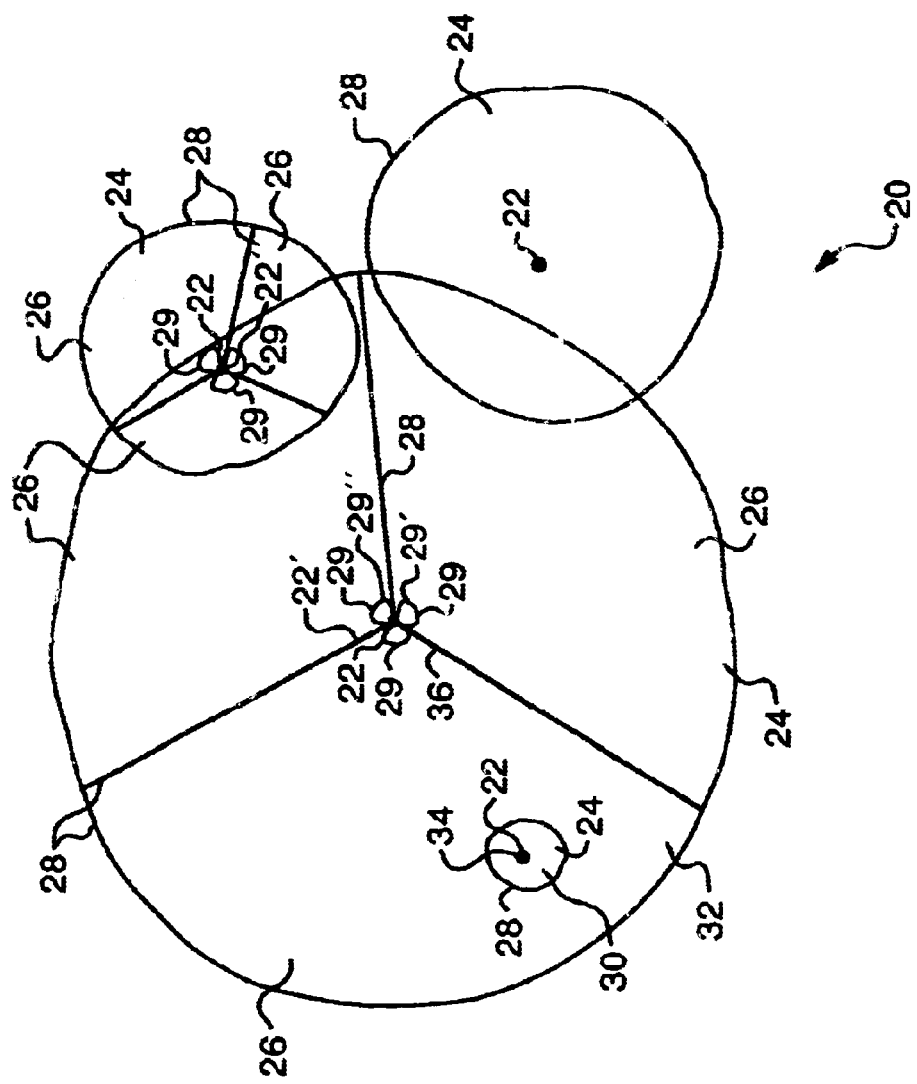
FIG. 1 shows a schematic layout diagram of a cellular communication network.

FIG. 1 shows a schematic layout diagram of a cellular communication network 20 that simulates an actual cellular environment. Network 20 is provided to show scenarios for which the present invention can advantageously be utilized in order to determine which server is more likely to control communications at a given location within network 20.

Network 20 includes a number of servers 22, also referred to as base stations. Each server 22 controls at least one cell 24 or a sector 26 of cell 24. In other words, cells 24 represent the geographic radio coverage areas of servers 22. Servers 22 may couple to mobile telephone switching offices (not shown) in a manner well known in the art. Cells 24 are shown as being generally circular in shape. This circular representation is convenient for schematically denoting a cell's radio coverage area. Those skilled in the art will appreciate that the actual shape and size of cells 24 will vary from cell to cell.

Network 20 is shown with only four of cells 24 to provide exemplary scenarios in which two or more cells 24 or sectors 26 may overlap. Those skilled in the art will recognize that a conventional cellular communication network can include many more cells 24. In addition, only two of cells 24 are shown subdivided into sectors 26 for clarity of illustration. However, a cellular network may include several cells 24 that are subdivided into sectors 26. Alternatively, the cellular network may not include any sectored cells.

Network 20 shows each of cells 24 and sectors 26 delineated by theoretical boundaries 28. Of course, it is well known in the telecommunications industry that control of cellular communication in an actual cellular environment is not rigidly divided as indicated by boundaries 28. Rather, overlap of cellular communication coverage occurs along theoretical boundaries 28 between neighboring cells 24 and sectors 26. The present invention associates servers 22 with particular locations in network 20 to more accurately portray this real world scenario. The present invention is particularly advantageous along boundaries 28 separating cells 24 and sectors 26.

For cells 24 divided into sectors 26, servers 22 are represented by sector servers 29. By convention, each sector 26 of a sectored one of cells 24 is served by a directional antenna (not shown), as well as associated transmit and receive circuitry (not shown). The directional antenna and the associated transmit and receive circuitry form one of sector servers 29. Thus, the "sector server" nomenclature used herein indicates the elements of server 22 dedicated to providing radio coverage service in a particular one of sectors 26.

FIG. 1 further illustrates a microcell 30 located within one of cells 24, referred to herein as a macrocell 32. A microcell server 34 controls communication in microcell 30. Likewise, one of servers 22, referred to herein as a macrocell server 36, controls communication in macrocell 32. Since microcell 30 is wholly located within macrocell 32, microcell 30 represents an overlapping region of cellular coverage. The present invention advantageously associates one of microcell and macrocell servers 34 and 36 with locations in the overlapping region of microcell 30.

The present invention is implemented in order to mitigate the effects of selection bias when determining which of the servers should be associated with the locations in the overlapping radio coverage areas described above.

Figure 2:
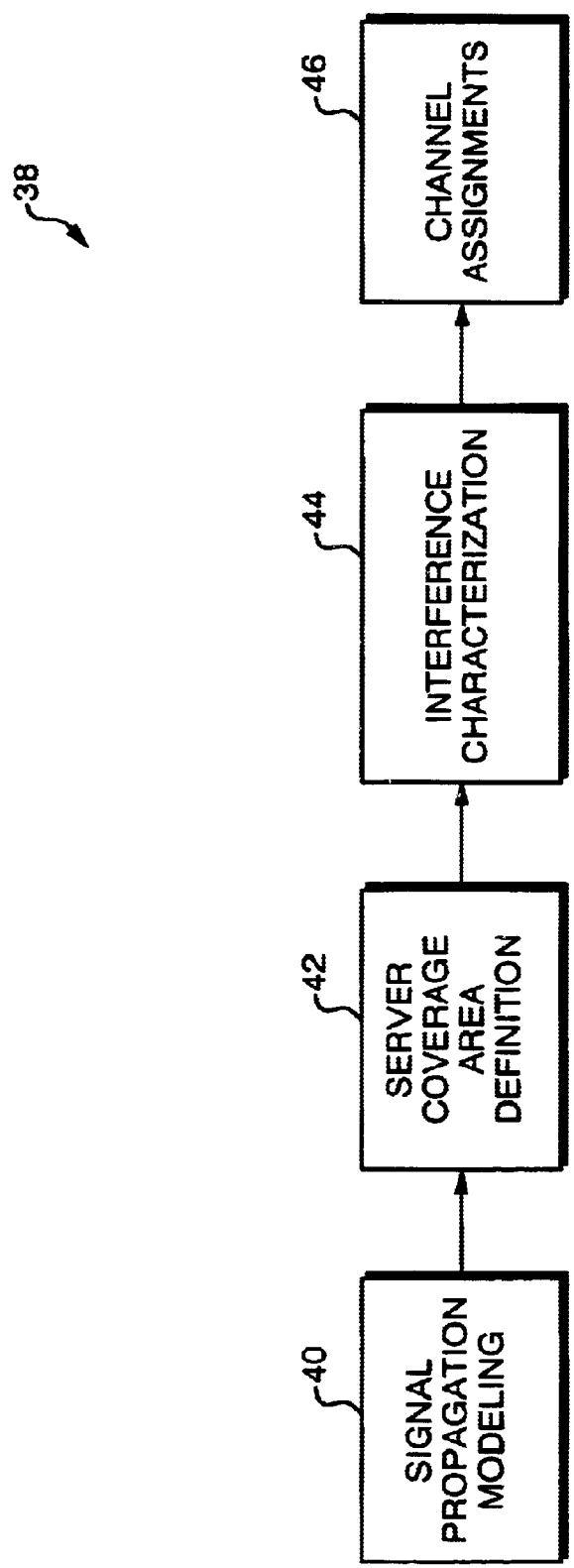
FIG. 2 shows a block diagram of a network planning tool.

FIG. 2 shows a block diagram of an exemplary network planning tool 38. Network planning tool 38 includes processes that may be implemented for optimizing network 20. Optimization of network 20 includes, for example, utilizing a minimum number of servers 22 (FIG. 1) to cover an entire geographic area, minimizing cochannel and adjacent channel interference, minimizing blocking probability of each call at each server, maximizing the utilization of the radiofrequency spectrum assigned to network 20, and so forth.

Exemplary network planning tool 38 includes a signal propagation modeling process 40, a server coverage area definition process 42, an interference characterization process 44, and a channel assignments process 46.

Signal propagation modeling process 40 is implemented to predict the propagation of radiofrequency signals from transmitter locations, to characterize the behavior of signal loss as a function of propagation distance, and to account for other effects, such as terrain obstructions, sloping terrain, road orientation, and so forth. Signal propagation modeling process 40 may employ ray tracing techniques, image trees, and such known to those skilled in the art. The information produced by signal propagation modeling process 40 includes predicted propagation paths of radiofrequency signals transmitted from various locations throughout network 20 (FIG. 1) and relative signal strength, i.e., power, of the radiofrequency signals along the predicted propagation paths.

The signal strength calculations along the predicted propagation paths are subsequently used by server coverage area definition process 42, which is the subject of the present invention. Server coverage area definition process 42 is employed to associate particular servers 22 with particular locations within network 20 (FIG. 1). Server coverage area definition process 42 will be described in detail herein. The information generated through the execution of process 42 is utilized by the subsequent interference characterization process 44 and channel assignments process 46.

Figure 3:
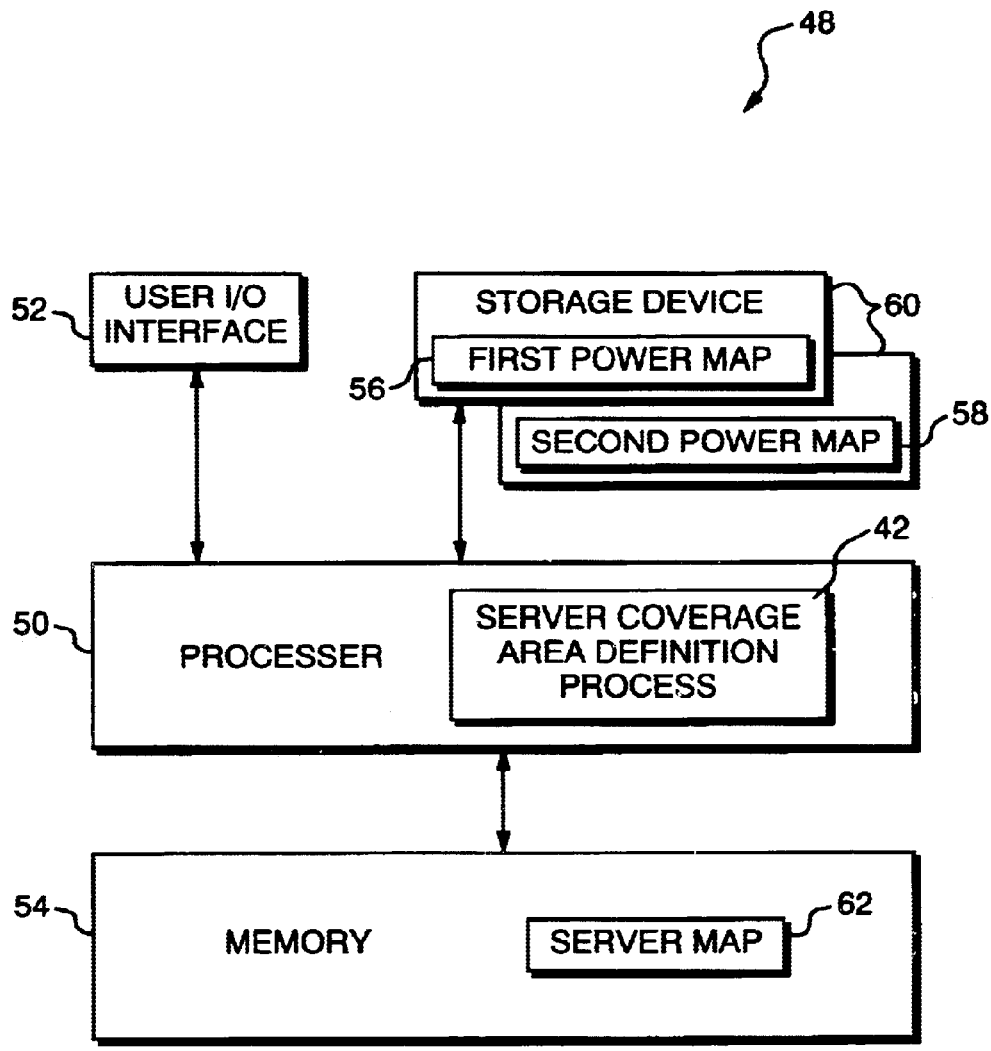
FIG. 3 shows a simplified block diagram of a system for executing a server coverage area definition process.

FIG. 3 shows a simplified block diagram of a system 48 for executing server coverage area definition process 42. System 48 includes a processor 50 on which the methods according to the invention can be practiced. Processor 50 is in communication with user I/O interface 52 and memory 54.

Processor 50 also includes a data reader (not shown) for reading data, such as a first power map 56 and a second power map 58 from a storage device 60. The data reader may include a hard disk drive internal or external to processor 50, a tape drive, floppy disk drive, CD-ROM, or a combination thereof. Storage device 60 may be a floppy disk, a compact disk, a personal computer memory card international association (PCMCIA) card, and the like.

An input portion of user I/O interface 52 may include, but is not limited to, input devices such as a keyboard, mouse, trackball, joystick, touch sensitive tablet or screen, or a combination thereof for entering data and commands into processor 50. Likewise, an output portion of user I/O interface 52 may include output devices utilizing any known means for displaying textual, graphical, or video images from processor 50. The components of system 48 discussed above may be implemented utilizing several known off-the-shelf components.

Processor 50 is capable of executing some or all of a number of software routines, for example, server coverage area definition process 42. Memory 54 is addressable storage space, accessible by processor 50, which stores information or instructions for use. In addition, memory 54 has stored therein a server map 62 generated during the execution of server coverage area definition process 42 (discussed below).

Although processor 50 is described as performing server coverage area definition process 42, it should be readily understood that processor 50 may be utilized to execute some or all of the processes that form network planning tool 38 (FIG. 2). Alternatively, different portions of process 42 as well as different portions of processes 40, 44, and 46 (FIG. 2) may be distributed over a plurality of processors.

Figure 4:
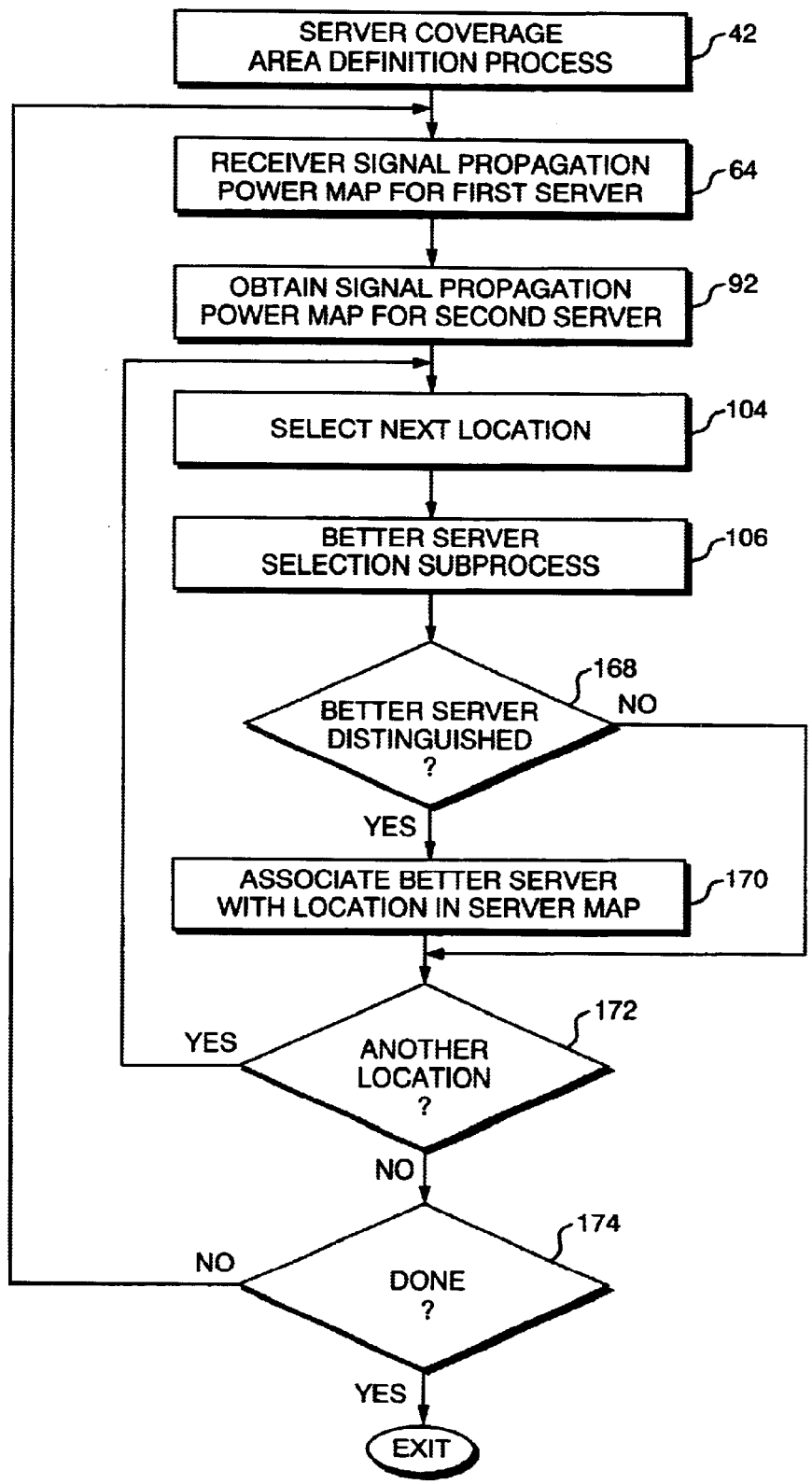
FIG. 4 shows a flow chart of a server coverage area definition process.

FIG. 4 shows a flow chart of server coverage area definition process 42. Process 42 is performed in response to radiofrequency signal propagation predictions obtained through signal propagation modeling process 40 (FIG. 2). Process 42 is performed to determine which of servers 22 (FIG. 1) is a better server for each location in network 20. In other words, process 42 determines which of the servers in the actual cellular environment is more likely to provide communication service to a radio communication device located at an actual geographic location that corresponds to the location in the simulated environment of network 20 (FIG. 1).

Process 42 begins with a task 64. At task 64, processor 50 receives first signal propagation power map 56 (FIG. 3). Signal propagation power map 56 is generated through the execution of signal propagation modeling process 40 (FIG. 2). In other words, process 40 predicts the propagation of radiofrequency signals from transmitter locations (i.e., the servers and/or sector servers) and calculates a detected signal level of a radiofrequency signal as a function of the propagation distance along a predicted propagation path.

Figure 5:
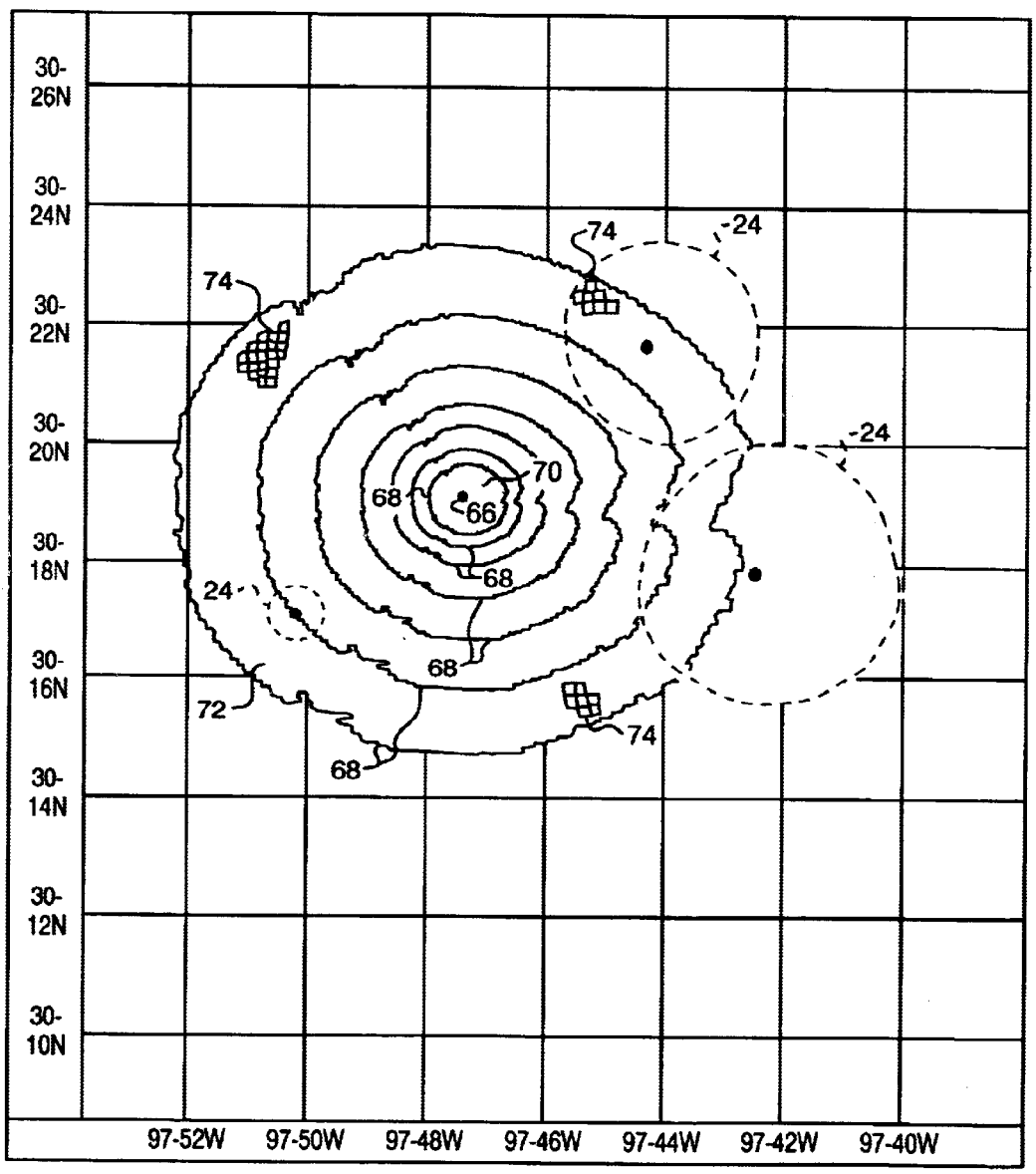
FIG. 5 shows an exemplary first signal propagation power map.

FIG. 5 shows an exemplary first signal propagation power map 56. First power map 56 (FIG. 5) shows a signal power level of radiofrequency signals transmitted from a first transmitting server 66. The power level is generally represented in the form of rings 68 of reducing power level ranges outwardly propagating from first transmitting server 66. For example, an area 70 between first transmitting server 66 and an innermost one of rings 68 represents a greatest detected power level range of the radiofrequency signals transmitted from server 66. Likewise, an area 72 between two outermost rings 68 represents a lowest detected power level range of the radiofrequency signals transmitted from server 66. First power map 56 may be graphically presented on a monitor of user I/O interface 52 (FIG. 3) where each power level area between each of rings 68 may be represented by a different color.

First power map 56 shows the power level of the radiofrequency signals propagating in all directions from first transmitting server 66 as illustrated by rings 68. In other words, first power map 56 shows the radiofrequency signals transmitted from each of sector servers 29 (FIG. 1) of first transmitting server 66. However, it should be understood that first power map 56 could also be shown representing the power level of radiofrequency signals propagating from only one of sector servers 29 (FIG. 1) of first transmitting server 66. If such were the case, rings 68 would be shown outwardly radiating through only one of sectors 26 (FIG. 1).

Referring momentarily to network 20 (FIG. 1) in connection with first power map 56, first transmitting server 66 corresponds to a first server 22' of servers 22. The others of cells 24 are shown in first power map 56 in ghost form so that one can readily relate the information shown in first power map 56 to the remainder of network 20.

Referring back to first power map 56 (FIG. 5), in a preferred embodiment, network 20 (FIG. 1) is subdivided into a plurality of pixels 74, of which only a few are shown in first power map 56. Pixels 74 are the basic units that make up network 20. Since network 20 simulates an actual cellular environment, each of pixels 74 relates to the smallest area of interest, i.e. location, in the actual environment. For example, each of pixels 74 represents a location in the actual environment having an area of approximately one hundred meters by one hundred meters.

Figure 6:
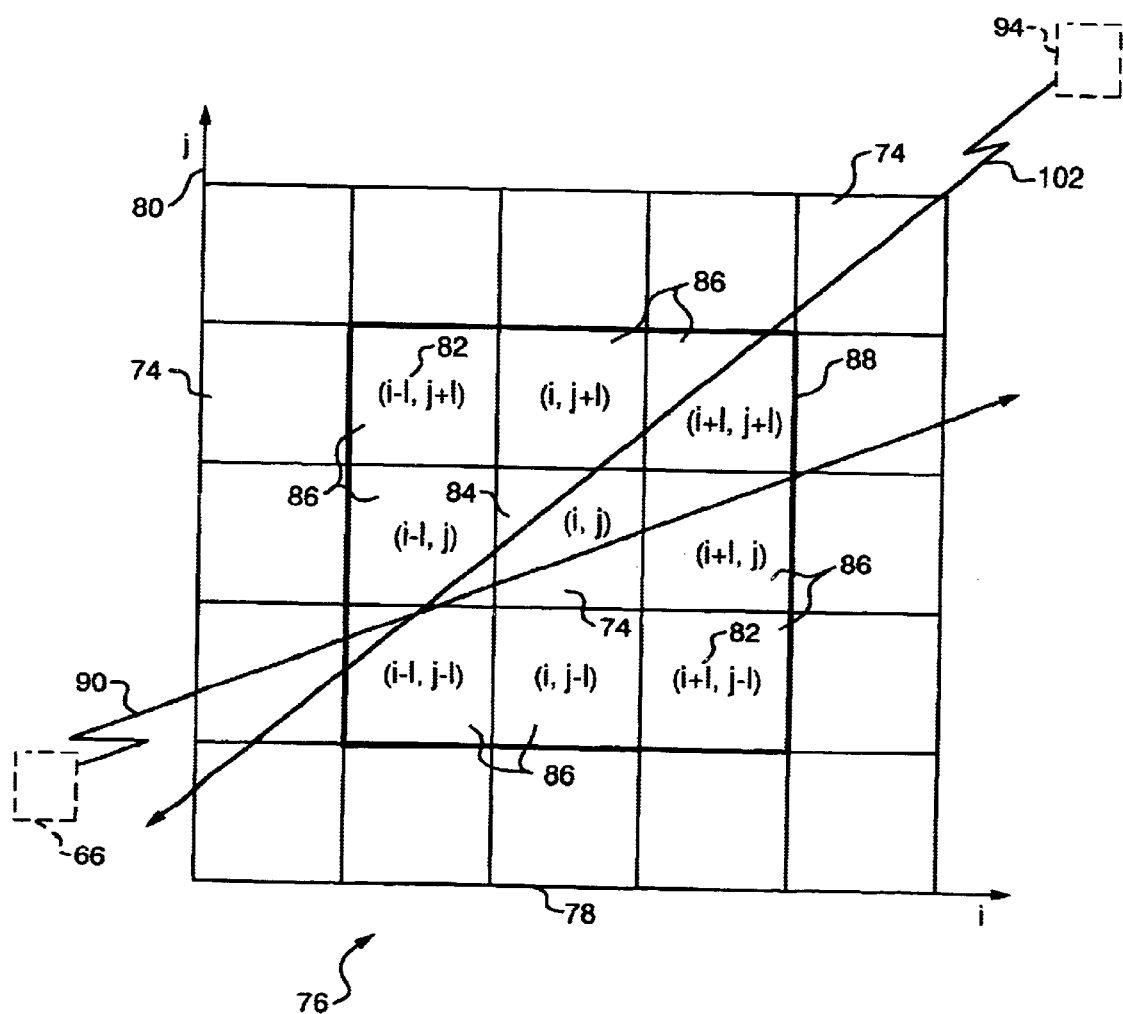
FIG. 6 shows an array of pixels corresponding to pixels shown in the first power map of FIG. 5.

FIG. 6 shows an array 76 of pixels 74 corresponding to a few of pixels 74 shown in power map 56 (FIG. 5). Array 76 is portrayed in two-dimensional form having a width 78 designated by the alphabetic character, "i", and a height 80, designated by the alphabetic character, "j". Thus, array 76 illustrates an arbitrary portion of network 20 (FIG. 1) of five pixels 74 by five pixels 74.

Location coordinates 82 for each of pixels 74 are described in terms of width 78 and height 80. For example, location coordinates 82 for a first pixel 84 are (i,j). Each of pixels 74 approximates a square. Thus, there are eight adjacent pixels 86 bordering first pixel 84 having location coordinates 82 corresponding to (i−1,j+1), (i,j+1), (i+1,j+1), (i−1,j), (i+1,j), (i−1,j−1), (i,j−1), and (i+1,j−1). Together, first pixel 84 and adjacent pixels 86 form a proximity region 88 (discussed below).

Through the execution of signal propagation modeling process 40 (FIG. 2), a first radiofrequency signal 90 projects through proximity region 88. First radiofrequency signal 90 is propagating along a predicted propagation path from first transmitting server 66, represented in ghost form. Rings 68

(FIG. 5) in first power map 56 (FIG. 5) represent the power level of first radiofrequency signal 90 as it propagates from first transmitting server 66. First radiofrequency signal 90 is shown as propagating along a single propagation path from transmitting server 66 for clarity of illustration. However, it should be readily apparent to those skilled in the art that radiofrequency signal 90 propagates along many propagation paths that may or may not be projecting through test region 88.

Referring back to server coverage area definition process 42 (FIG. 4), following the receipt of signal propagation power map 56 (FIG. 5) in task 64, process 42 proceeds to a task 92. Task 92 causes processor 50 (FIG. 3) to obtain second power map 58 (FIG. 3). Second power map 58 is produced in response to radiofrequency signals propagating from another transmitting server, such as one of servers 22, sector servers 29, or microcell server 34.

Figure 7:
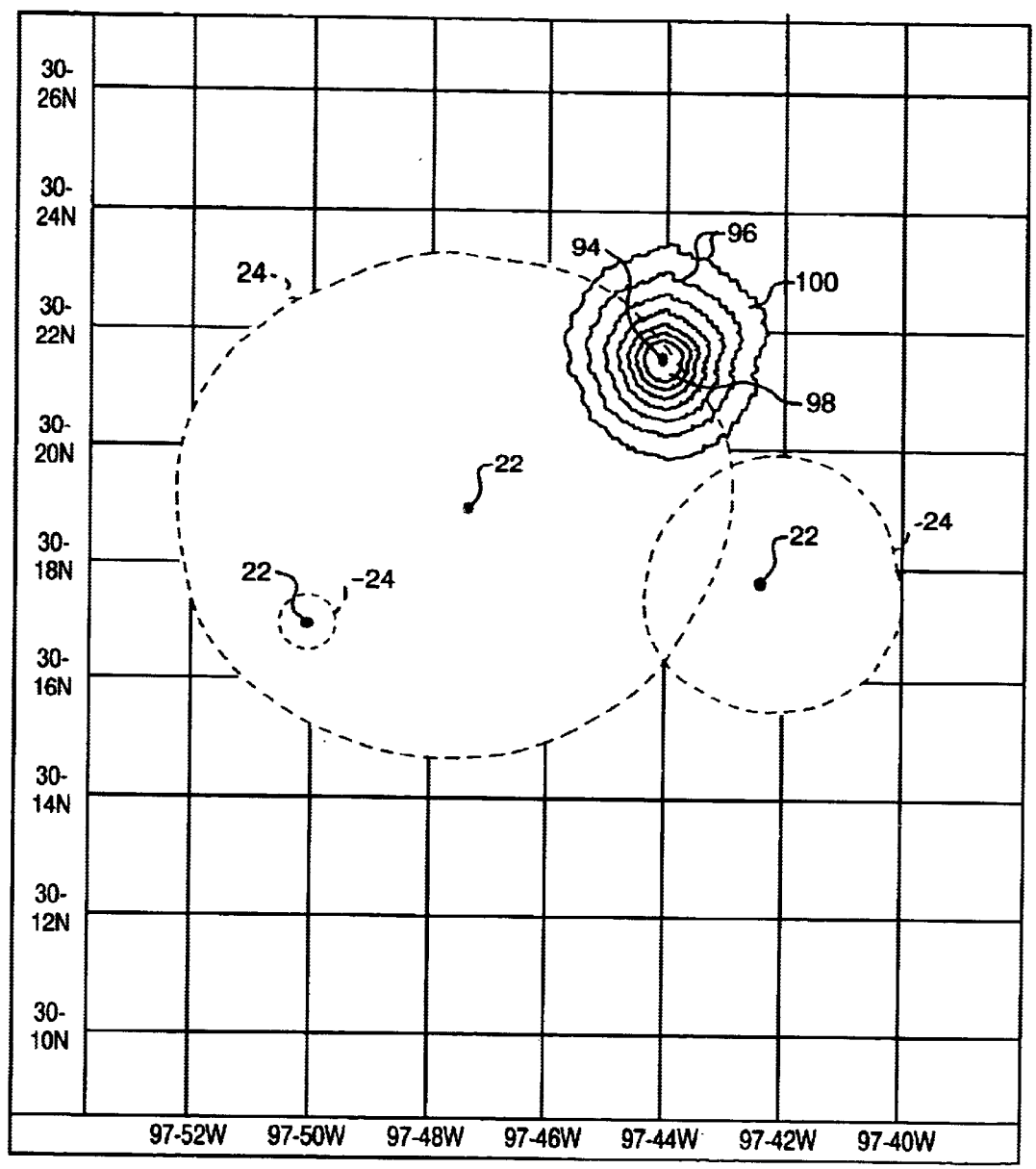
FIG. 7 shows an exemplary second signal propagation power map.

FIG. 7 shows an exemplary second signal propagation power map 58. As shown in second power map 58, a signal power level of radiofrequency signals transmitted from a second transmitting server 94 are represented in the form of rings 96 of reducing power level ranges outwardly propagating from second transmitting server 94. An area 98 between second transmitting server 94 and an innermost one of rings 96 represents a greatest detected signal level range of radiofrequency signals transmitted from server 94. Likewise, an area 100 between two outermost rings 96 represents a lowest detected signal level range of radiofrequency signals transmitted from server 94. Like first power map 56, second power map 58 may be graphically presented on a monitor of user I/O interface 52 (FIG. 3) where each power level area between each of rings 96 may be represented by a different color.

Second power map 58 shows the power level of the radiofrequency signals propagating in all directions from second transmitting server 94 as illustrated by rings 96. In other words, second power map 58 shows the radiofrequency signals transmitted from each of sector servers 29 (FIG. 1) of second transmitting server 94. However, it should be understood that second power map 58 could be shown representing the power level of radiofrequency signals propagating from only one of sector servers 29 (FIG. 1) of first transmitting server 94. If such were the case, rings 96 would be shown outwardly radiating through only one of sectors 26 (FIG. 1).

Referring momentarily to network 20 (FIG. 1) in connection with second power map 58, second transmitting server 94 corresponds to a second server 22" of servers 22 for clarity of illustration. The others of cells 24 are shown in second power map 58 in ghost form so that one can readily relate the information shown in second power map 58 to the remainder of network 20.

With reference to array 76 (FIG. 6), through the execution of signal propagation modeling process 40 (FIG. 2), a second radiofrequency signal 102 projects through proximity region 88. Second radiofrequency signal 102 is propagating along a predicted propagation path from second transmitting server 94, represented in ghost form. Rings 96 (FIG. 7) in second power map 58 (FIG. 7) represent the power level of second radiofrequency signal 102 as it propagates from second transmitting server 94. Second radiofrequency signal 102 is shown as propagating along a single propagation path from second transmitting server 94 for clarity of illustration. However, it should be readily apparent to those skilled in the art that radiofrequency signal 102 propagates along many propagation paths that may or may not be projecting through test region 88.

Referring back to server coverage area definition process 42 (FIG. 4), following the receipt of second signal propagation power map 58 (FIG. 7) in task 92, process 42 proceeds to a task 104. Task 104 causes processor 50 (FIG. 3) to select one of pixels 74 (FIG. 6) representing a location within an actual environment represented by network 20 for further evaluation. A better server selection subprocess 106 is performed in connection with the selected one of pixels 74. To clarify the understanding of the present invention, first pixel 84 (FIG. 6) is selected at task 104.

Figure 8:
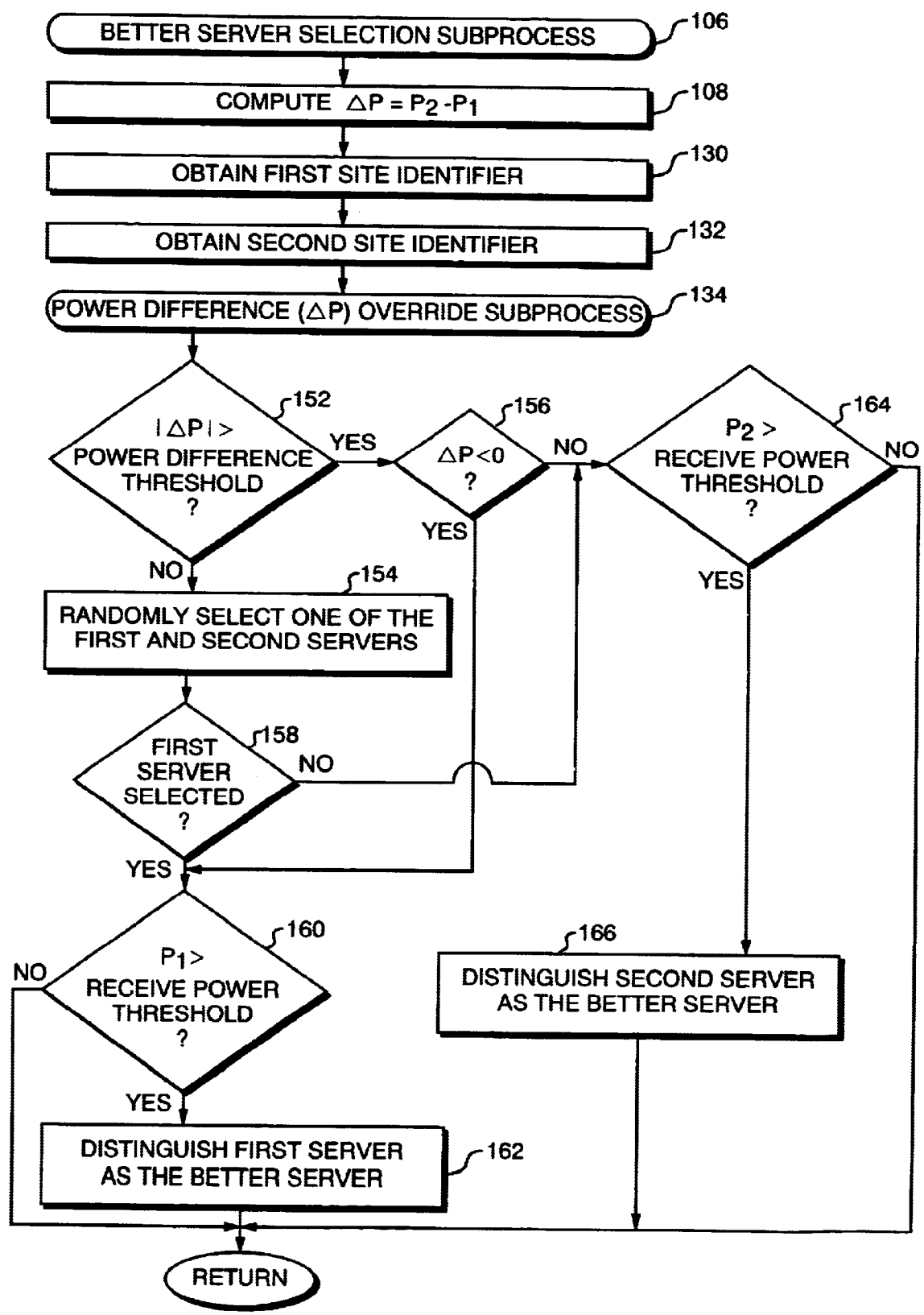
FIG. 8 shows a flow chart of a better server selection subprocess.

FIG. 8 shows a flow chart of better server selection subprocess 106. Subprocess 106 is performed for each of pixels 74 of network 20 (FIG. 1) to determine which of servers 22, sector servers 29, microcell server 34, and macrocell server 36 (FIG. 1) is more likely to control radio communication at a location in the actual cellular environment corresponding to the selected pixel 74 in network 20. Subprocess 106 is particularly effective for determining a better server in overlapping regions of radio communication coverage about theoretical boundaries 28 (FIG. 1).

Subprocess 106 begins with a task 108. Task 108 causes processor 50 (FIG. 3) to compute a power difference (ΔP) between a second power level ($P_2$) for second radiofrequency signal 102 (FIG. 6) and first power level ($P_1$) for first radiofrequency signal 90. Thus, processor 50 computes the following:

$$\Delta P = P_2 - P_1$$

FIG. 9 shows a table 110 combining data obtained from first power map 56 (FIG. 5) and second power map 58 (FIG. 7). Table 110 includes location coordinates field 112, a first server site identifier field 114, and a first power level, $P_1$, field 116 associated with first server site identifier field 114. In addition, table 110 includes a second server site identifier field 118, and a second power level, $P_2$, field 120 associated with second server site identifier field 118.

Table 110 only shows data for those pixels 74 in proximity region 88 (FIG. 6) for clarity of illustration. However, such data is available for all pixels 74 describing network 20. In addition, table 110 only includes data from first and second power maps 56 of two sites for clarity of illustration. However, power maps from all servers 22 in network 20 (FIG. 1) is desirably available so that an exhaustive search may be made for a better one of servers 22 to associate with each of pixels 74.

Location coordinates 82 (FIG. 6) describing each of pixels 74 are shown in location coordinates field 112 of table 110. A first site identifier 122; shown in first server site identifier field 114, represents a cell site in the actual cellular environment at which first server 66 (FIG. 6) resides. For simplicity of illustration, first site identifier 122 is denoted by the alphabetic character "A". First power level values 124 for first radiofrequency signal 90 (FIG. 6) are shown in first power level field 116 of table 110 associated with first site identifier 122.

Likewise, a second site identifier 126, shown in second server site identifier field 118, represents a cell site in the actual cellular environment at which second server 94 resides. For simplicity of illustration, second site identifier 126 is denoted by the alphabetic character "B". Second power level values 128 for second radiofrequency signal 102 (FIG. 6) are shown in second power level field 128 associated with second site identifier 126.

First power level values 124 represent the signal strength of first radiofrequency signal 90 propagating along a predicted propagation path and detectable at pixels 74 through which it propagates. Likewise, second power level values 128 represent the signal strength of second radiofrequency signal 102 propagating along a predicted propagation path and detectable at pixels 74 through which it propagates.

Table 110 also shows dashes, "-", in each of first and second server site identifier fields 114 and 118. The dashes indicate that first and second radiofrequency signals 90 and 102, respectively, are not detected at those pixels 74 with which they are associated. The dots, ".", in first and second site identifier fields 114 and 118 indicate a continuation of data. Accordingly, the dots could be first or second site identifiers 122 and 126, respectively, or the dots could be dashes indicating that neither of first and second radiofrequency signals 90 and 102 are detected in those pixels with which they are associated. Likewise, the dots, "." in first and second power level fields 116 and 120, respectively, indicate the continuation of data. Hence, the dots could be first or second power level values 124 and 128, respectively. Alternatively, the dots could represent zeros, "0", which indicate that no power level is detected at those pixels 74 at which first and second radiofrequency signals 90 and 102 are not detected.

Since first pixel 84 was the location selected in task 104 (FIG. 4) of server coverage area definition process 42 (FIG. 4), at computing task 108 (FIG. 8) of subprocess 106. (FIG. 8), processor 50 computes $\Delta P = P_2 - P_1 = 112 - 111 = 1$ dB.

Referring back to subprocess 106, following the computation of $\Delta P$ in task 108, program control proceeds to a task 130. At task 130, processor 50 obtains first site identifier 122 (FIG. 9). In this exemplary case, first site identifier 122 is denoted by the alphabetic character "A".

A task 132 is performed in connection with task 130. At task 132, processor 50 obtains second-site identifier 126 (FIG. 9). In this exemplary case, second site identifier 126 is denoted by the alphabetic character "B". In response to tasks 130 and 132, a task 134 is performed.

Task 134 causes processor 50 to perform a power difference, $\Delta P$, override subprocess. $\Delta P$ override subprocess 134 is performed to influence the subsequent activities of subprocess 106. The computed $\Delta P$ is overridden by replacing it with a large positive or large negative override value that forces a later selection of a particular one of first and second servers 66 and 94, respectively. This override feature will be readily understood by the following description.

Figure 10:
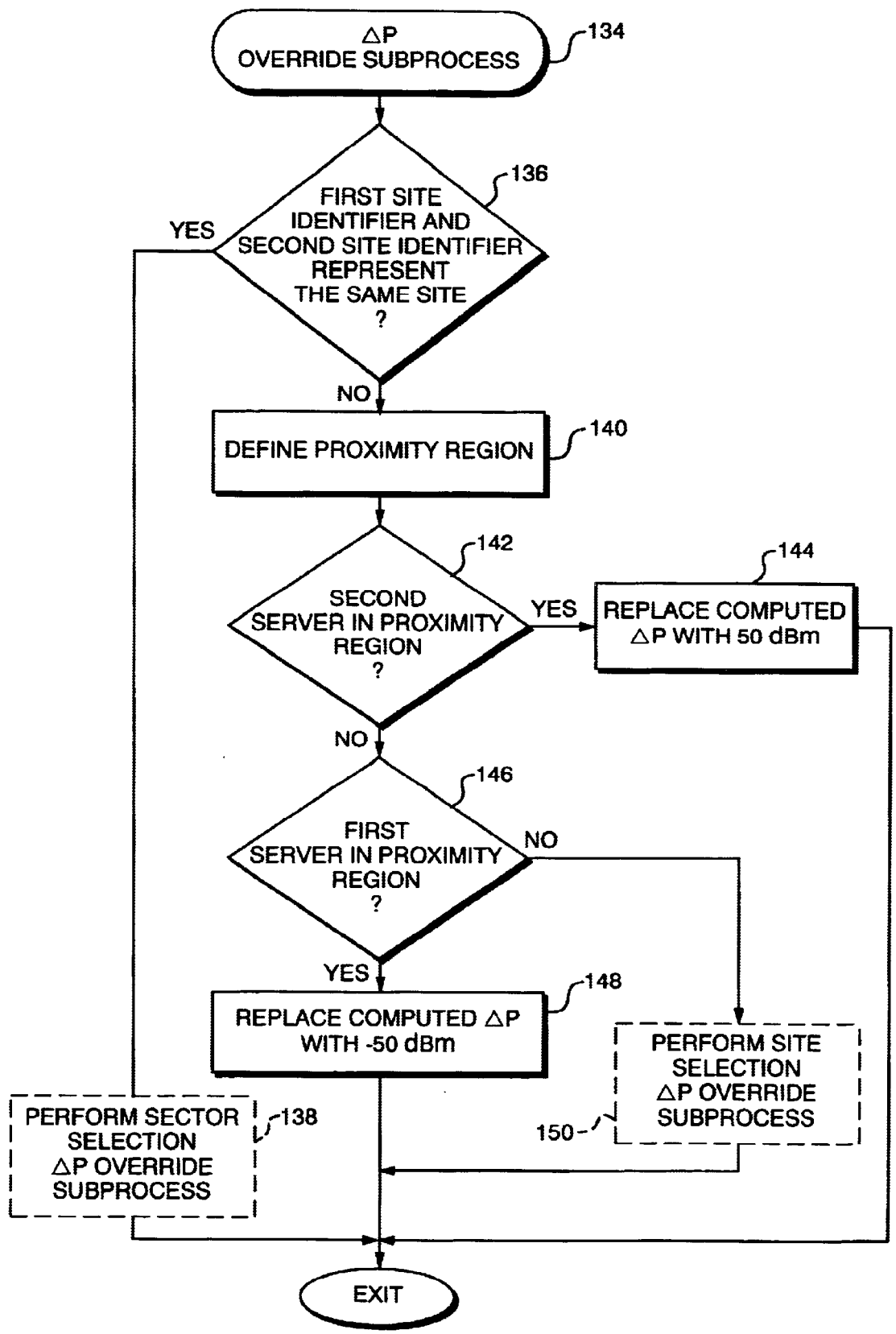
FIG. 10 shows a flow chart of a power difference, ΔP, override subprocess.

FIG. 10 shows a flow chart of power difference ($\Delta P$) override subprocess 134. Subprocess 134 begins with a query task 136. Query task 134 causes processor 50 (FIG. 3) to evaluate first site identifier 122 (FIG. 9) and second site identifier 126 (FIG. 9) obtained in tasks 130 and 132 of subprocess 106 (FIG. 8) to determine if they represent the same cell site. For example, first and second site identifiers 122 and 126 represent the same cell site when first and second radiofrequency signals 90 and 102, respectively, are transmitted from two sector servers 29 (FIG. 1) from the same one of cells 24.

When query task 136 determines that first and second site identifiers 122 and 126 represent the same cell site, $\Delta P$ override subprocess 134 exits with no override value replacing the computed $\Delta P$.

In an alternative embodiment of the present invention, an optional sector selection override subprocess 138, shown in ghost form, may be performed when query task 136 determines that first and second site identifiers 122 and 126 represent the same cell site. Subprocess 138 is performed to compel selection of one of the two sector servers 29 (FIG. 1) by replacing the computed $\Delta P$ with a large positive or large negative override value. Subprocess 138 will be described in detail below.

When query task 136 determines that first and second site identifiers 122 and 126 do not represent the same cell site, $\Delta P$ override subprocess 134 proceeds to a task 140. In other words first and second servers 66 and 94, respectively, control different ones of cells 24.

At task 140, processor 50 (FIG. 3) defines proximity region 88 (FIG. 6). In other words, processor 50 identifies adjacent pixels 86 (FIG. 6) that are adjacent to the selected location, that is, first pixel 84 (FIG. 6). Following task 140, a query task 142 is performed.

At query task 142, processor 50 (FIG. 3) evaluates second site identifier 126 (FIG. 9) to determine if second server 94 (FIG. 6) is located in proximity region 88 (FIG. 6). In other words, in the exemplary scenario in which the selected one of pixels 74 is first pixel 84 (FIG. 6), query task 142 determines if second server 94 is very close to first pixel 84. When query task 142 determines that second server 94 is located in proximity region 88, subprocess 134 proceeds to a task 144.

Task 144 causes processor 50 to replace the computed power difference, $\Delta P$, with an override value. For example, in the preferred embodiment, the computed $\Delta P$, that is, 1 dB, is replaced with a large positive value such as 50 dB. Following task 144, subprocess 134 exits having replaced the computed $\Delta P$ with an override value of 50 dB set to compel selection of second server 94 to be the better server. In other words, $\Delta P$ is now equal to 50 dB.

However, when query task 142 determines that second server 94 is not located in proximity region 88, subprocess 134 proceeds to a query task 146. At query task 146, processor 50 evaluates first site identifier 122 (FIG. 9) to determine if first server 66 is located in proximity region 88. Accordingly, query task 146 determines if first server 66 is very close to first pixel 84 (FIG. 6). When query task 146 determines that first server 66 is located in proximity region 88, subprocess 134 proceeds to a task 148.

Task 148 causes processor 50 to replace the computed power difference, $\Delta P$, with an override value. For example, in the preferred embodiment, the computed $\Delta P$, that is, 1 dB, is replaced with a large negative value such as −50 dB. Following task 148, subprocess 134 exits having replaced the computed $\Delta P$ with an override value of −50 dB set to compel selection of first server 66 to be the better server. In other words, $\Delta P$ is now equal to −50 dB. The reason for 50 dB compelling selection of second server 94 or −50 dB compelling selection of first server 66 is explained below.

When query task 146 determines that first server 66 is not in proximity region 88, subprocess 134 exits with no override value replacing the computed $\Delta P$.

In an alternative embodiment of the present invention, an optional site selection power difference, $\Delta P$, override subprocess 150, shown in ghost form, may be performed when query tasks 142 and 146 determine that neither of first and second servers reside in proximity region 88. Subprocess 150 may be performed to compel selection of one first and second servers 66 and 94 as the better server by replacing the computed $\Delta P$ with a large positive or large negative override value. Subprocess 150 will be described in detail below.

Query tasks 142 and 146 are proximity tests. That is, tasks 142 and 146 determine whether either of first and second servers 66 and 94, respectively, are within one pixel 74 of first pixel 84 (FIG. 6). A proximity test is particularly useful when first pixel 84 is located in microcell 30 (FIG. 1) which is overlapped by macrocell 32 (FIG. 1). In such a scenario, the power level of the radiofrequency signal transmitted from macrocell server 36 (FIG. 1) may be greater than the power level of the radiofrequency signal transmitted from microcell server 34 (FIG. 1), because of the greater necessary transmission distances from macrocell server 36. Thus, if macrocell server 36 is associated with all pixels 74 located in microcell 30, bias toward macrocell server 36 is introduced. Such bias leads to errors in frequency planning calculations. Accordingly, the proximity tests circumvent this problem by insisting that each server 22 in network 20 serve at least the pixel 74 in which it is located and the eight pixels 74 immediately surrounding the server 22.

Following the proximity testing of query tasks 142 and 146, the replacement of the computed power difference, $\Delta P$, with an override value in tasks 144 and 148, or following the execution of either of optional tasks 138 and 150, subprocess 134 exits and program control returns to better server selection subprocess 106 (FIG. 8).

With reference back FIG. 8, following subprocess 134, program control proceeds to a query task 152. At query task 152, processor 50 (FIG. 3) determines if the absolute value of the power difference, $\Delta P$, is greater than a power difference threshold. As a result of the execution of subprocess 134, query task 152 may be evaluating either the computed $\Delta P$ or the override value that replaced $\Delta P$.

The power difference threshold is a parameter that characterizes the accuracy of network planning tool 38 (FIG. 2). For example, if the power level calculations of the radiofrequency signals are performed using a signal propagation modeling process 40 (FIG. 1) that is very accurate and first and second power maps 56 and 58 are of very high resolution, the power difference threshold may be 1 dB. Whereas, coarser calculations may result in the power difference threshold being 6 dB.

When query task 152 determines that the absolute value of $\Delta P$ is less than the power difference threshold, better server selection subprocess 106 proceeds to a task 154. Accordingly, with the absolute value of $\Delta P$ being less than the power difference threshold, the received first and second power level values 124 and 128 (FIG. 9) are considered equal. Alternatively, when the absolute value of $\Delta P$ is greater than the power difference threshold, better server selection subprocess 106 proceeds to a task 156 (discussed below).

At task 154, processor 50 randomly selects one of first and second servers 66 and 94, respectively, to be the better server for first pixel 84. In other words, when first and second power level values 124 and 128 are considered equal, subprocess 106 cannot make any decisions about which will be the better server based on the power levels of the detected radiofrequency signals. Accordingly, the selection of one of first and second servers 66 and 94 is made on a substantially random basis.

Random selection task 154 mimics what happens in a actual cellular environment. In an actual cellular environment, one of first and second servers 66 and 94 will be favored by random events such as a large truck passing by, or by blocking due to trees or other structures near the user of the radio communication device. In a geographical database where one of pixels 74 represents a location in the actual cellular environment of approximately one hundred by one hundred meters, it is not time and cost effective to try to account for these effects deterministically. Accordingly, random selection task 154 is performed.

In a preferred embodiment, task 154 desirably employs a substantially unbiased random selection technique. In other words, both of first and second servers 66 and 94 are equally likely to be selected. One exemplary technique employs checking whether the last bit of a random or pseudorandom number is a zero or a one. When the last bit is a zero, first server 66 is selected. Likewise, when the last bit is a one, second server 94 is selected.

In an alternative embodiment, task 154 employs a biased random selection technique. In other words, one of first and second servers 66 and 94 is favored over the other for selection. In general, a network planner may want to favor one of servers 66 and 94 over the other during random selection task 154 for the purpose of improving the quality of service or for more efficient use of the network infrastructure.

For example, when a network needs to be temporarily modified to provide extra capacity, such as during conventions or sporting events, a temporary server is erected at the location of the event to handle the extra call traffic. This temporary server will interact with the already established network. That is, the coverage area of the temporary server will overlap one or more coverage areas for other servers. Such a scenario could result in substantially equivalent power level values so that the absolute value of the power difference, $\Delta P$, is less than the power difference threshold.

In such a case, the network planner may desirably favor the temporary server so as to not overload the existing servers. The bias could be extreme—associate all pixels in the coverage area of the temporary server to the temporary server so that all calls are controlled by the temporary server. Alternatively, the network planner may bias random selection task 154 so that the temporary server is associated with approximately seventy percent of the pixels in the temporary server coverage area so that most but not all calls in the temporary server coverage area will be controlled by the temporary server.

Following task 154, better server selection subprocess 106 proceeds to a query task 158. Query task 158 determines if first server 66 (FIG. 6) is selected. When query task 158 determines that first server 66 is selected by, for example, the detection of a zero in the last bit of a random number, selection subprocess 106 proceeds to a query task 160 to evaluate first power level value, $P_1$, 124 (FIG. 9).

Query task 160 compares first power level value, $P_1$, 124 at first pixel 84 (FIG. 9) to a receive power threshold value. A receive power threshold of approximately one hundred decibels (dB) may be utilized since that is a conventional sensitivity level for a receiver at a location corresponding to the selected first pixel 84. When query task 160 determines that first power level value, $P_1$, 124 is not greater than the receive power threshold, subprocess 106 exits. In other words, first power level value, $P_1$, 124 is too low to be detected by a radio communication device located at a location corresponding to first pixel 84. As such, neither of first and second servers 66 and 94 is distinguished as a better server.

However, when query task 160 determines that first power level value, $P_1$, 124 is greater than the server power threshold, subprocess 106 proceeds to a task 162. Task 162 distinguishes first server 66 as the better server. That is, following random selection of first server 66 in task 154 and since first power level value, $P_1$, 124 is greater than the server power threshold in query task 160, first server 66 qualifies to be distinguished as a better server for first pixel 84 (FIG. 6). Following task 162, subprocess 106 exits.

Returning back to query task 158, when first server 66 is not selected, subprocess 106 proceeds to a query task 164. In other words, through the execution of random selection task 154, second server 94 was selected by, for example, the detection of a one in the last bit of a random number.

Query task 164 is similar in function to query task 160. Query task 164 compares second power level value, $P_2$, 128 at first pixel 84 (FIG. 9) to the receive power threshold value. When query task 164 determines that second power level value, $P_2$; 128 is not greater than the receive power threshold, subprocess 106 exits. As a result, neither of first and second servers 66 and 94 is distinguished as a better server since second power level value, $P_2$, 128 is too low to be detected by a radio communication device at a location in the actual cellular environment corresponding to first pixel 84.

However, when query task 164 determines that second power level value, $P_2$, 128 is greater than the receive power threshold, subprocess 106 proceeds to a task 166. Task 166 is similar in function to task 162. Accordingly, task 166 distinguishes second server 94 as the better server. That is, following random selection of second server 94 in task 154 and since second power level value, $P_2$, 128 is greater than the server power threshold in query task 164, second server 94 qualifies to be distinguished as a better server for first pixel 84 (FIG. 6). Following task 166, subprocess 106 exits.

With reference back to query task 152, when query task 152 determines that the absolute value of the power difference, $\Delta P$, is greater than the power difference threshold, selection of a better one of first and second servers 66 and 94, need not be based on random selection. Rather, subprocess 106 proceeds to query task 156 to evaluate the power difference, $\Delta P$.

Query task 156 determines if the power difference, $\Delta P$, is less than zero. As discussed previously, $\Delta P$ was computed from the formula $\Delta P = P_2 - P_1$. As a result, $\Delta P$ is the difference between second power level value, $P_2$, 128 and first power level value, $P_1$, 124. Thus, when $\Delta P$ is less than zero, first server 66 is further considered for distinction as a better server at first pixel 84 (FIG. 6). First server 66 is further considered because first power level value, $P_1$, 124 is greater than second power level value, $P_2$, 128. Likewise, when $\Delta P$ is greater than zero, second server 94 is further considered for distinction as a better server at first pixel 84 (FIG. 6). Second server 94 is further considered because second power level value, $P_2$, is greater than first power level value, $P_1$.

When query task 156 determines that $\Delta P$ is less than zero, subprocess 106 proceeds to task 160 to evaluate first power level value, $P_1$, 124 against the receive power threshold to determine if first server 66 can be distinguished as the better server in task 162. Alternatively, when query task 156 determines that $\Delta P$ is not less than zero, subprocess 106 proceeds to task 164 to evaluate second power level value, $P_2$, 128 against the receive power threshold to determine if second server 94 can be distinguished as the better server in task 166.

After subprocess 106 exits, program control returns to a query task 168 of server coverage area definition process 42 (FIG. 4). At query task 168, processor 50 (FIG. 3) determines if one of first and second servers 66 and 94, respectively (FIG. 6) was distinguished as a better server through the execution of subprocess 106. When one of first and second servers 66 and 94 was distinguished as a better server, process 42 proceeds to a task 170. At task 170, processor 50 associates the distinguished better server with the evaluated one of pixels 74 (FIG. 6) in server map 62 (FIG. 3). Server map 62 will be described in detail below.

Following task 170, process 42 proceeds to a query task 172. Alternatively, when query task 168 determines that a better server was not distinguished through the execution of better server selection subprocess 106, program control proceeds to query task 172.

At query task 172, processor 50 (FIG. 3) determines if there is another one of pixels 74 (FIG. 3), corresponding to another location in the actual cellular environment, to be evaluated for selection of a better server. Query task 172 causes processor 50 to look for another one of pixels 74 identified in either of first and second power maps 56 (FIG. 5) and 58 (FIG. 7), respectively. When query task 172 determines that there is another one of pixels 74, process 42 loops back to task 104 to select the next pixel 74 corresponding to a location in the actual environment.

When query task 172 determines that there is not another one of pixels 74, process 42 proceeds to a query task 174. Query task 174 determines if process 42 is done. In other words, processor 50 looks for signal propagation power maps for other servers 22 and signal propagation power maps for any sector servers 29. Query task 174 is performed to distinguish a better server for every one of pixels 74 (FIG. 5) representing all locations in the actual cellular network. This is accomplished by comparing every radiofrequency signal detected at a pixel and transmitted from a transmitting server with all other detected radiofrequency signals transmitted from transmitting servers and detected at the same pixel.

When query task 174 determines that process 42 is not done, program control loops back to tasks 64 and 92 to receive addition signal propagation power maps and repeat the ensuing better server selection subprocess 106. However, when query task 174 determines that process 42 is done, process 42 exits.

Figure 11:
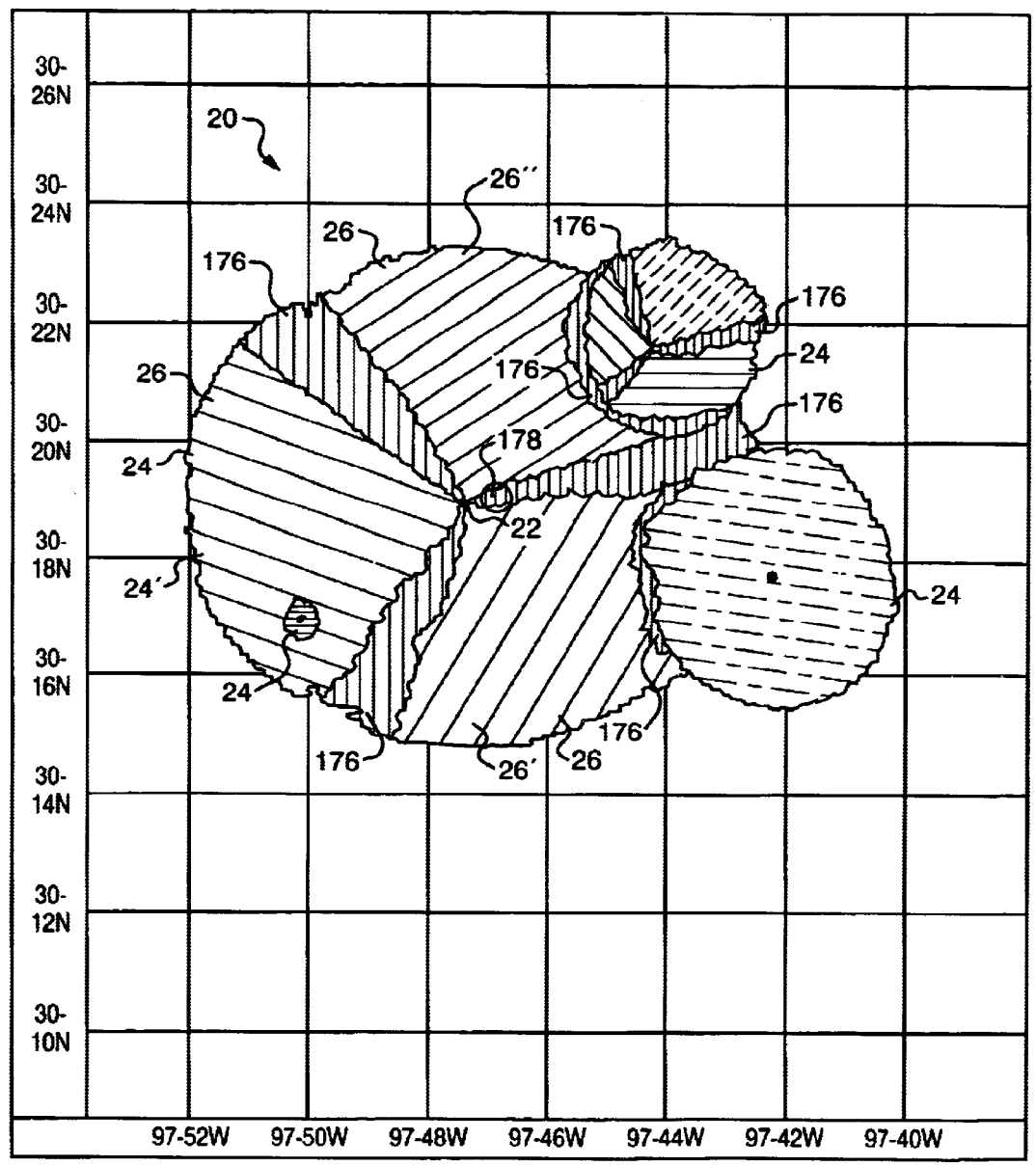
FIG. 11 shows an exemplary better server map of the network developed through the execution of the server coverage area definition process of FIG. 4.

FIG. 11 shows an exemplary server map 62 of network 20 developed through the execution of process 42. A selected better server is associated with each pixel 74 (FIG. 3) and recorded on server map 62. A more realistic radio coverage area of each of cells 24 is shown in server map 62 as contrasted with the theoretical coverage areas for each of cells 24 shown in network 20 of FIG. 1.

For example, a first radio coverage area 24' is divided into three sectors 26. Each of sectors 26 is represented in server map 62 by a different pattern of hatch marks. Each distinct sector 26 is served by a corresponding one of sector servers 29 (FIG. 1). Each sector 26 is separated by an overlapping coverage region 176. Regions 176 represent those locations served by one or more sector servers 29 or servers 22 of overlapping cells. Regions 176 provide a more realistic representation of radio communication coverage in an actual environment than theoretical boundary 28 (FIG. 1).

Figure 12:
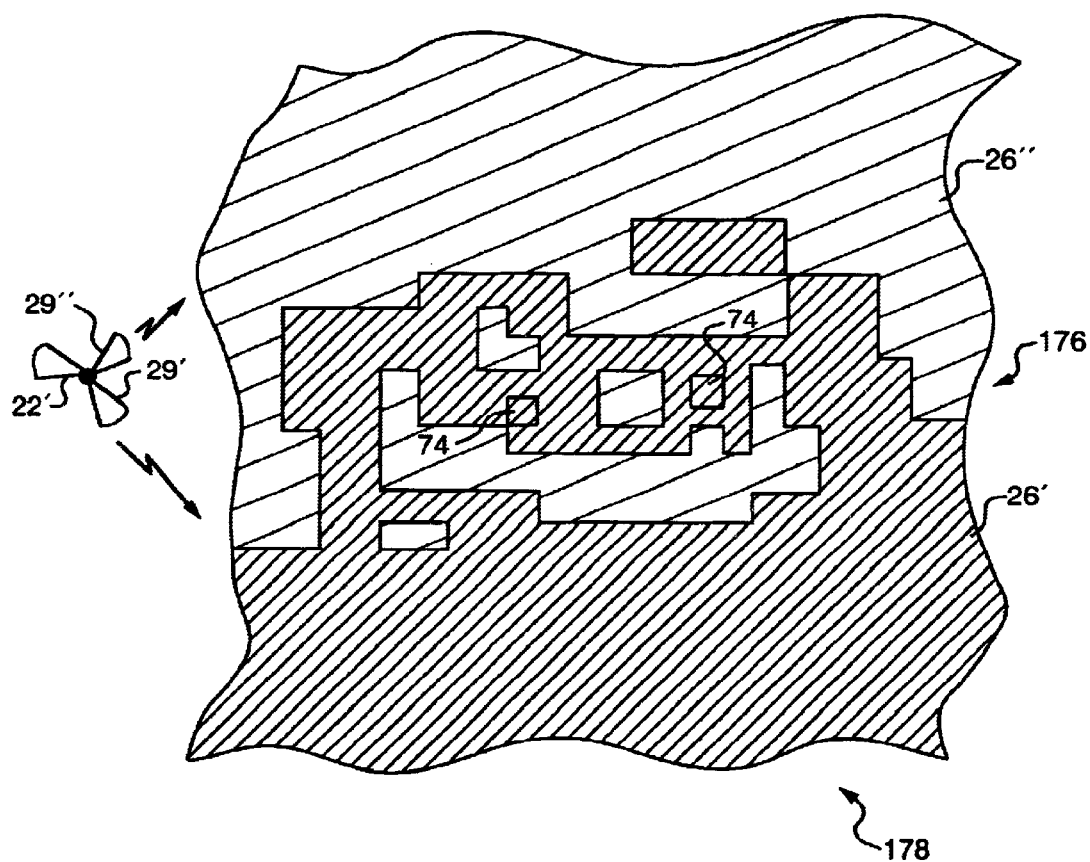
FIG. 12 shows a greatly enlarged view of a portion of the better server map of FIG. 11.

FIG. 12 shows a greatly enlarged view 178 of a portion of server map 62. A first sector radio coverage area 26' is served by a first sector server 29' (see also FIG. 1) and a second sector radio coverage area 26" is served by a second sector server 29" (see also FIG. 1). Pixels 74, a few of which are shown in ghost form, in overlapping region 176 are associated with one of first and second sector servers 29' and 29" as illustrated by the distinct hatch marks distinguishing each of first and second sector radio coverage areas 26' and 26".

Referring to FIGS. 11-12, the boundaries of overlapping regions 176 are advantageously fuzzy. That is, they are not sharp boundaries like theoretical boundaries 28 (FIG. 1). Moreover, region 176 is interspersed with areas of coverage provided by first sector server 29' and second sector server 29". The fuzzy nature of regions 176 and the combining of first and second sector radio coverage areas 26' and 26" produced through the execution of process 42 desirably provides a more realistic representation of an actual cellular environment.

Figure 13:
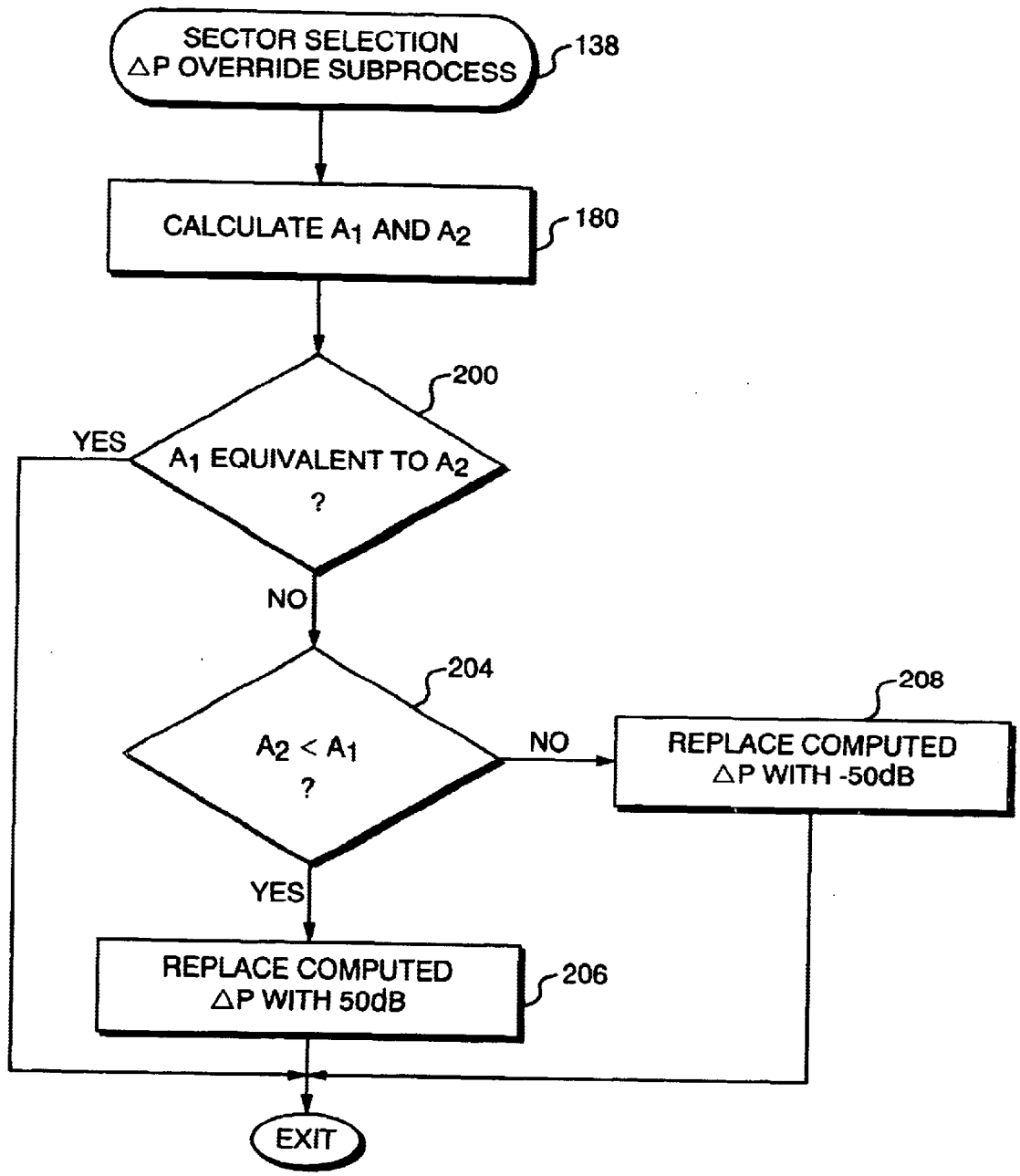
FIG. 13 shows a flow chart of a sector selection power difference, ΔP, override subprocess.

FIG. 13 shows a flow chart of sector selection power difference, $\Delta P$, override subprocess 138. Subprocess 138 is an optional process that may be performed in connection with power difference, $\Delta P$, override subprocess 134 (FIG. 10). Referring momentarily to $\Delta P$ override subprocess 134

(FIG. 10), when query task 136 determines that first site identifier 122 and second site identifier 126 represent the same cell site, subprocess 138 is performed.

With reference back to subprocess 138 (FIG. 13), sector selection power difference, ΔP, override subprocess 138 is performed to replace the computed ΔP with an override value (+ or −50 dB) set to compel the selection of one of two servers when the servers are adjacent sector servers 29 (FIG. 1). Sector selection power difference, ΔP, override subprocess 138 improves the precision of better server selection subprocess 106 (FIG. 8) by reducing the frequency of performing random selection task 154 (FIG. 8). In addition, the replacement of the computed ΔP with an override value in subprocess 138 is advantageously performed so that the subsequent activities of better server selection subprocess 106 (FIG. 8) may be executed without modification to subprocess 106. Subprocess 138 begins with a task 180.

Figure 14:
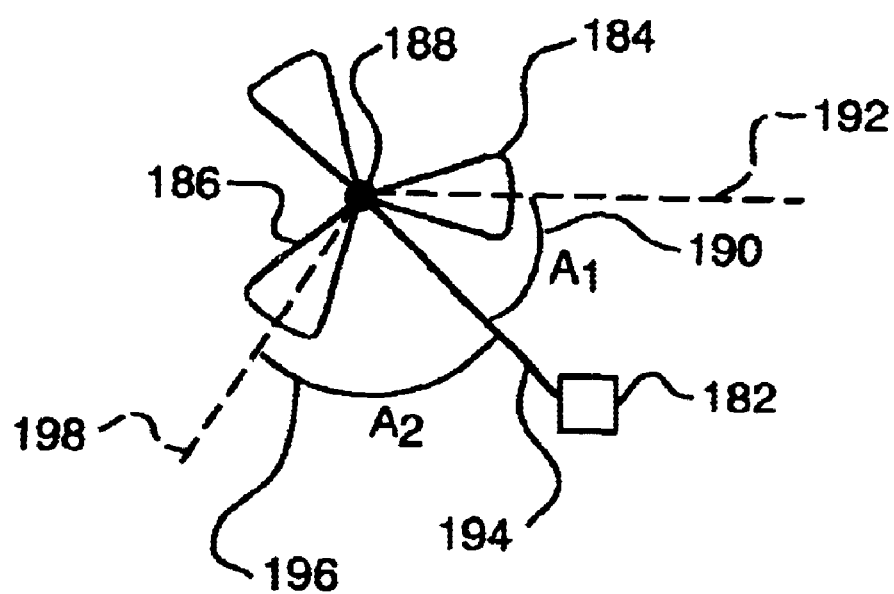
FIG. 14 shows a diagram of a location under consideration for sector server selection.

Referring to FIG. 14 in connection with subprocess 138, FIG. 14 shows a diagram of a location, pixel 182, under consideration for sector server selection. A first sector server 184 and a second sector server 186 are located at a common cell site 188. Radiofrequency signals (not shown) transmitted from each of first and second sector servers 184 and 186 are detectable at pixel 182.

Task 180 causes processor 50 (FIG. 3) to calculate a first angle, $A_1$, 190 between a first main beam 192 of a first directional antenna (not shown) of first sector server 184 and a line 194 extending from common cell site 188 to pixel 182. Likewise, processor 50 calculates a second angle, $A_2$, 196 between a second main beam 198 of a second directional antenna (not shown) of second sector server 186 and line 194.

Following task 180, a query task 200 is performed. At query task 200, processor 50 (FIG. 3) determines if first angle 190 is substantially equivalent to second angle 196. Equivalency is responsive to the accuracy of the calculations of network planning tool 38 (FIG. 2). Thus, equivalency may be established when first angle 190 and second angle 196 are within some angular difference threshold. For example, if a difference between first and second angles 190 and 196, respectively, is within two degrees, query task 200 will determine that first and second angles 190 and 196 are substantially equivalent.

When query task 200 determines that first and second angles 190 and 196 are substantially equivalent, sector selection ΔP override subprocess 138 exits. In other words, first and second angles 190 and 196 are so similar that neither of first and second sector servers 184 and 186 can be distinguished as a better sector server. Such a scenario may occur when pixel 182 is close to theoretical boundary 28 (FIG. 1) separating coverage areas of two of sector servers 29 (FIG. 1) of network 20 (FIG. 1).

However, when query task 200 determines that first and second angles 190 and 196 are not substantially equivalent, subprocess 138 proceeds to a query task 204. Query task 204 determines if second angle 196 is less than first angle 190. In other words, query task 204 causes processor 50 (FIG. 3) to determine which of first main beam 192 of first sector server 184 and second main beam 198 of second sector server 186 is closer to pixel 182.

When second angle 196 is less than first angle 190, second main beam 198 is closer to pixel 182 and subprocess 138 proceeds to a task 206. Task 206 causes processor 50 to replace the computed power difference, ΔP, with an override value. For example, in the preferred embodiment, the computed ΔP is replaced with a large positive value such as 50 dB. Following task 206, subprocess 138 exits having replaced the computed ΔP with an override value of 50 dB set to compel selection of second sector server 186 to be the better server. In other words, ΔP is now equal to 50 dB.

However, when query task 204 determines that second angle 196 is not less than first angle 190, subprocess 138 proceeds to a task 208. Thus, first main beam 192 propagating from first sector server 184 is closer to pixel 182 than second main beam 198 propagating from second sector server 186.

Task 208 causes processor 50 to replace the computed power difference, ΔP, with an override value. For example, in the preferred embodiment, the computed ΔP is replaced with a large negative value such as −50 dB. Following task 208, subprocess 138 exits having replaced the computed ΔP with an override value of −50 dB set to compel selection of first sector server 184 to be the better server. In other words, ΔP is now equal to −50 dB. Program control subsequently returns to ΔP override subprocess 134.

Figure 15:
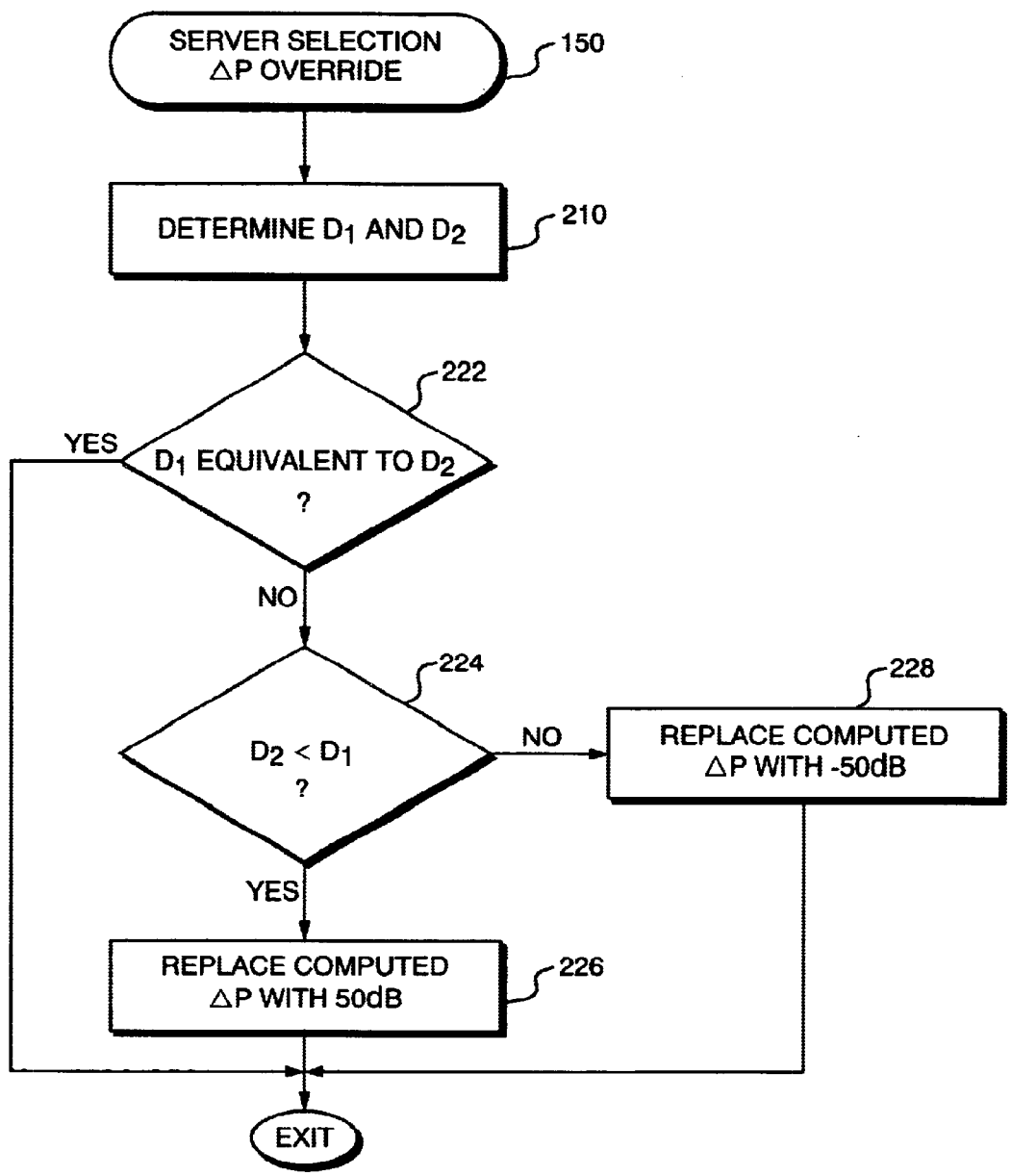
FIG. 15 shows a flow chart of a server selection power difference override, ΔP, subprocess.

FIG. 15 shows a flow chart of server selection power difference ΔP override testing subprocess 150. Subprocess 150 is an optional process that may be performed in connection with power difference override subprocess 134 (FIG. 10). Referring momentarily to ΔP override subprocess 134 (FIG. 10), when query tasks 142 and 146 determine that neither of the first and second servers reside in proximity region 88 (FIG. 6), subprocess 150 is performed.

With reference back to subprocess 150 (FIG. 15), server selection power difference, ΔP, override subprocess 150 is performed to replace the computed ΔP with an override value (+ or −50 dB) set to compel the selection of one of two servers when neither of the servers are located in proximity region 88 (FIG. 6). Server selection power difference, ΔP, override subprocess 150 improves the precision of better server selection subprocess (FIG. 8) by reducing the frequency of performing random selection task 154 (FIG. 8). In addition, the replacement of the computed ΔP with an override value in subprocess 150 is advantageously performed, so that the subsequent activities of better server selection subprocess 106 (FIG. 8) may be executed without modification to subprocess 106. Subprocess 150 begins with a task 210.

Figure 16:
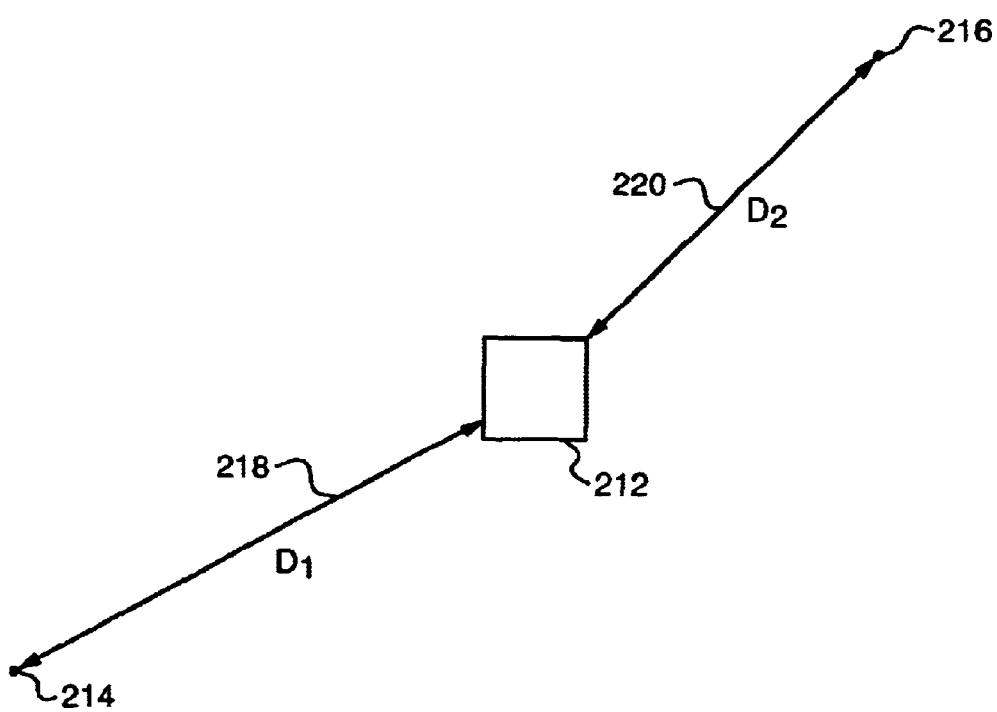
FIG. 16 shows a diagram of a location under consideration for server selection.

Referring to FIG. 16 in connection with subprocess 150, FIG. 16 shows a diagram of a location, pixel 212, under consideration for server selection. First site identifier 122 (FIG. 9) for a first server 214 and second site identifier 126 (FIG. 9) for a second server 216 indicate that first and second servers 214 and 216 are located at a different cell sites. Radiofrequency signals (not shown) transmitted from each of first and second servers 214 and 216 are detectable at pixel 212.

Task 210 causes processor 50 (FIG. 3) to calculate a first distance, $D_1$, 218 between a first server 214 and pixel 212. Likewise, processor 50 calculates a second distance, $D_2$, 220 between second server 216 and pixel 212.

Following task 210, a query task 222 is performed. At query task 222, processor 50 (FIG. 3) determines if first distance 218 is substantially equivalent to second distance 220. Equivalency is responsive to the accuracy of the calculations of network planning tool 38 (FIG. 2). Thus, equivalency may be established when first distance 218 and second distance 220 are within some difference threshold. For example, if a difference between first and second distances 218 and 220, respectively, is within two meters, query task 222 will determine that first and second distances 218 and 220 are substantially equivalent.

When query task 222 determines that first and second distances 218 and 220 are substantially equivalent, server selection ΔP override subprocess 150 exits. In other words, first and second distances 218 and 220 are so similar that neither of first and second servers 214 and 216 can be distinguished as a better server. Such a scenario may occur when pixel 212 is close to theoretical boundary 28 (FIG. 1) separating two cells 24 (FIG. 1) of network 20 (FIG. 1).

However, when query task 222 determines that first and second distances 218 and 220 are not substantially equivalent, subprocess 150 proceeds to a query task 224. Query task 224 determines if second distance 220 is less than first distance 218. In other words, query task 224 causes processor 50 (FIG. 3) to determine which of first and second servers 214 and 216, respectively, is closer to pixel 212.

When second distance 220 is less than first distance 218, second server 216 is closer to pixel 212 and subprocess 150 proceeds to a task 226. Task 226 causes processor 50 to replace the computed power difference, ΔP, with an override value. For example, in the preferred embodiment, the computed ΔP is replaced with a large positive value such as 50 dB. Following task 226, subprocess 150 exits having replaced the computed ΔP with an override value of 50 dB set to compel selection of second server 216 to be the better server. In other words, ΔP is now equal to 50 dB.

However, when query task 224 determines that second distance 220 is not less than first distance 218, subprocess 150 proceeds to a task 228. Thus, first server 214 is closer to pixel 212 than second server 216.

Task 228 causes processor 50 to replace the computed power difference, ΔP, with an override value. For example, in the preferred embodiment, the computed ΔP is replaced with a large negative value such as −50 dB. Following task 228, subprocess 150 exits having replaced the computed ΔP with an override value of −50 dB set to compel selection of first server 214 to be the better server. In other words, ΔP is now equal to −50 dB. Program control subsequently returns to ΔP override subprocess 134 (FIG. 10).

In summary, the present invention teaches of a system and method that associate a server with a pixel in a simulated cellular network to simulate radio coverage areas that approximate real world cellular network performance. The system and method define the radio coverage areas to more closely portray the actual cellular environment so that call traffic loads for overlapping cells may be accurately predicted. In particular, the system and method imitate the random selection character of the actual cellular environment when the difference between the power levels of received radiofrequency signals is insignificant. In addition, the system and method force the association of microcell servers to pixels adjacent the transmitting microcell server in order avoid the ill effects of macrocell selection bias when associating servers with pixels corresponding to locations in the actual cellular environment.

Although the preferred embodiments of the invention have been illustrated and described in detail, it will be readily apparent to those skilled in the art that various modifications may be made therein without departing from the spirit of the invention or from the scope of the appended claims. For example, the tasks described herein may be performed in a different order. In addition, a different selection criteria may be chosen for determining whether the computed power difference should be overridden in order to compel selection of a server.

What is claimed is:

1. A method of associating a server with a location in a cellular network comprising:

detecting a first radiofrequency signal exhibiting a first power level at said location, said first radiofrequency signal being transmitted from a first server;

detecting a second radiofrequency signal exhibiting a second power level at said location, said second radiofrequency signal being transmitted from a second server;

defining a proximity region surrounding said location; and when one of said first and second servers resides in said proximity region and a second one of said first and second servers resides outside of said proximity region, selecting said one of said first and second servers to associate with said location.

2. A method as claimed in claim 1 further comprising:
   establishing a receive power threshold; and
   performing said selecting operation when one of said first and second power levels for said one of said first and second servers exceeds said receive power threshold.

3. A method as claimed in claim 1 wherein said defining operation comprises:
   characterizing said location as a unit area; and
   identifying adjacent unit areas bordering said unit area, said unit area and said adjacent unit areas being included in said proximity region.

4. A method as claimed in claim 1 further comprising choosing one of said first and second servers exhibiting a greater one of said first and second power levels to associate with said location when neither of said first and second servers resides in said proximity region.

5. A method as claimed in claim 4 further comprising:
   establishing a receive power threshold; and
   performing said choosing operation when said greater one of said first and second power levels exceeds said receive power threshold.

6. A method as claimed in claim 4 further comprising:
   establishing a power difference threshold;
   computing a power difference between said first and second power levels; and
   performing said choosing operation when an absolute value of said power difference exceeds said power difference threshold.

7. A method as claimed in claim 1 further comprising:
   establishing a power difference threshold;
   computing a power difference between said first and second power levels;
   determining if an absolute value of said power difference is less than said power difference threshold; and
   substantially randomly selecting one of said first and second servers in response to said determining operation when neither of said first and second servers resides in said proximity region and when said absolute value of said power difference is less than said power difference threshold.

8. A method as claimed in claim 7 further comprising biasing said substantially randomly selecting operation to predispose selection toward a preferred one of said first and second servers.

9. A method as claimed in claim 1 further comprising:
   computing a power difference between said first and second power levels; and
   when said one of said first and second servers resides in said proximity region, replacing said power difference with an override value set to compel said selecting operation to select said one of said first and second servers.

10. A method as claimed in claim 1 wherein said first and second servers reside at cell sites, and said method further comprises:

obtaining a first site identifier for said first server;

obtaining a second site identifier for said second server; and performing said defining and selecting operations when said first and second site identifiers represent different ones of said cell sites.

11. A method as claimed in claim 1 wherein said first and second servers reside at cell sites, and said method further comprises:

obtaining a first site identifier for said first server;

obtaining a second site identifier for said second server;

confirming that said first and second site identifiers represent a common one of said cell sites;

calculating a first angle between a first main beam of a first directional antenna of said first server and a line extending from said common cell site to said location;

calculating a second angle between a second main beam of a second directional antenna of said second server and said line; and distinguishing a preferred sector server from said first and said second servers, said preferred sector server exhibiting a lesser one of said first and said second angles.

12. A method as claimed in claim 11 further comprising:

computing a power difference between said first and second power levels;

replacing said power difference with an override value set to compel selection of said preferred sector server; and selecting said preferred sector server in response to said replacing step.

13. A method as claimed in claim 1 wherein said first and second servers reside at cell sites, and said method further comprises:

obtaining a first site identifier for a first one of said cell sites at which said first server resides;

obtaining a second site identifier for a second one of said cell sites at which said second server resides;

ascertaining that neither of said first and second servers reside in said proximity region;

confirming that said first and second site identifiers represent different ones of said cell sites;

determining a first distance between said first cell site of said first server and said location;

determining a second distance between said second cell site of said second server and said location; and distinguishing a closer server from said first and second servers, said closer server exhibiting a lesser one of said first and second distances.

14. A method as claimed in claim 13 further comprising:

computing a power difference between said first and second power levels; and replacing said power difference with an override value set to compel selection of said closer server; and selecting said closer server in response to said replacing step.

15. A method as claimed in claim 1 wherein said selecting operation comprises recording said one of said first and second servers in association with said location in a better server map.

16. A method as claimed in claim 1 further comprising:

repeating said receiving, obtaining, defining, and selecting operations for each of a plurality of locations; and defining a first coverage area for said first server and a second coverage area for said second server in response to said repeating operation.

17. A method as claimed in claim 16 further comprising performing channel assignment activities for said cellular network in response to said defined first and second coverage areas.

18. A system for associating a server with a location in a cellular network comprising:

an input element for receiving a first site identifier for a first server and a first power level of a first radiofrequency signal transmitted from said first server and detected at said location, said input element being further configured for obtaining a second site identifier for a second server and a second power level of a second radiofrequency signal transmitted from said second server and detected at said location;

a processor, in communication with said input element, wherein:

said processor computes a power difference between said first and second power levels;

when said processor determines that one of said first and second servers resides in a proximity region surrounding said location and a second one of said first and second servers resides outside of said proximity region, said processor selects said one of said first and second servers as a better server; and when said processor determines that neither of said first and second servers resides in said proximity region and an absolute value of said power difference is less than a power difference threshold, said processor substantially randomly selects one of said first and second servers as said better server; and a memory element, in communication with said processor, having stored therein a better server map for recording said better server in association with said location.

19. A system as claimed in claim 18 wherein said processor characterizes said location as a unit area, identifies adjacent unit areas bordering said unit area, and combines said unit area and said adjacent unit areas to establish said proximity region.

20. A system as claimed in claim 18 wherein when said processor determines that said one of said first and second servers resides in said proximity region, said processor replaces said power difference with an override value set to compel selection of said one of said first and second servers as said better server.

21. A system as claimed in claim 18 wherein said processor includes a bias element configured to predispose substantially random selection toward a preferred one of said first and second servers.

22. A system as claimed in claim 18 wherein when said processor determines that neither of said first and second servers resides in said proximity region and said absolute value of said power difference is greater than said power difference threshold, said processor selects one of said first and second servers exhibiting a greater one of said power levels as said better server.

23. A method of associating a server with a location in a cellular network comprising the steps of:

detecting a first radiofrequency signal exhibiting a first power level at said location, said first radiofrequency signal being transmitted from a first server residing at a first site identified by a first site identifier;

detecting a second radiofrequency signal exhibiting a second power level at said location, said second radiofrequency signal being transmitted from a second server residing at a second site identified by a second site identifier;

computing a power difference between said first and second power levels;

verifying said first and second site identifiers represent different ones of said first and second sites;

identifying, in response to said verifying step, a proximate server from said first and second servers, said proximate server residing in a proximity region surrounding said location;

replacing said power difference with an override value set to compel selection of said proximate server;

determining one of said first and second power levels for said proximate server exceeds a receive power threshold; and selecting said proximate server to associate with said location in response to said replacing and determining steps.

24. A method as claimed in claim 23 further comprising the steps of:

a) ascertaining said first and second site identifiers represent a common site;

b) calculating a first angle between a first main beam of a first directional antenna of said first server and a line extending from said common site to said location;

c) calculating a second angle between a second main beam of a second directional antenna of said second server and said line;

d) identifying a preferred sector server from said first and second servers, said preferred sector server exhibiting a lesser one of said first and second angles;

e) replacing said power difference with a second override value set to compel selection of said preferred sector server;

f) determining one of said first and second power levels for said preferred sector server exceeds said receive power threshold; and g) selecting said preferred sector server to associate with said location in response to said steps e) and f).

25. A method as claimed in claim 24 further comprising the steps of:

deducing said first and said second angles are substantially equivalent;

determining an absolute value of said power difference is less than a power difference threshold; and randomly selecting said preferred sector server to associate with said location in response to said deducing step.

26. A method as claimed in claim 23 further comprising the steps of:

a) ascertaining, in response to said verifying step, that neither of said first and second servers resides in said proximity region;

b) determining a first distance between said first site and said location;

c) determining a second distance between said second site and said location;

d) identifying a closer server from said first and second servers, said closer server exhibiting a lesser one of said first and second distances;

e) replacing said power difference with a second override value set to compel selection of said closer server;

f) determining one of said first and second power levels for said closer server exceeds said receive power threshold; and g) selecting said closer server to associate with said location in response to said steps e) and f).

27. A method as claimed in claim 26 further comprising the steps of:

deducing said firsthand said second distances are substantially equivalent;

determining an absolute value of said power difference is less than a power difference threshold; and randomly selecting one of said first and second servers to associate with said location in response to said determining operation.

* * * * *